(12) United States Patent
Abe

(10) Patent No.: US 10,353,117 B2
(45) Date of Patent: Jul. 16, 2019

(54) OPTICAL ELEMENT AND METHOD FOR PRODUCING THE SAME

(71) Applicant: CANON KABUSHIKI KAISHA, Tokyo (JP)

(72) Inventor: Susumu Abe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 15/411,757

(22) Filed: Jan. 20, 2017

(65) Prior Publication Data
US 2017/0212278 A1 Jul. 27, 2017

(51) Int. Cl.
*G02B 1/115* (2015.01)

(52) U.S. Cl.
CPC .................... *G02B 1/115* (2013.01)

(58) Field of Classification Search
CPC .......... G02B 1/115; G02B 1/11; G02B 1/041; G02B 1/14; G02B 1/105; G02B 1/111; G02B 1/118; G02B 1/04; G02B 1/10; G02B 1/18; G02B 5/285; G02B 1/113; G02B 1/116; G02B 15/173; G02B 1/12; G02B 27/0006; G02B 27/0018; G02B 5/282; G02B 15/14; G02B 15/177; G02B 1/043; G02B 2207/109; G02B 5/0242; G02B 5/0278; G02B 5/0294; G02B 5/208; G02B 5/286; G02B 5/287; G02B 7/022; G02B 13/001; G02B 13/18; G02B 1/02; G02B 2207/107; G02B 27/646; G02B 3/00; G02B 5/005; G02B 5/0808; G02B 5/201; G02B 5/22; G02B 5/223; G02B 13/002; G02B 13/003; G02B 13/0055; G02B 13/006; G02B 13/06; G02B 15/16; G02B 15/22; G02B 15/28; G02B 1/00; G02B 1/16; G02B 26/001; G02B 26/008; G02B 26/06; G02B 26/10; G02B 26/125; G02B 27/0037;
(Continued)

(56) References Cited

U.S. PATENT DOCUMENTS

2006/0291061 A1* 12/2006 Iyama .................... G02B 5/282
359/614
2010/0134752 A1* 6/2010 Toda ...................... G02B 1/115
351/158
(Continued)

FOREIGN PATENT DOCUMENTS

CN 102565886 A 7/2012
CN 104216034 A 12/2014
(Continued)

*Primary Examiner* — Collin X Beatty
*Assistant Examiner* — Grant A Gagnon
(74) *Attorney, Agent, or Firm* — Canon U.S.A. Inc., IP Division

(57) ABSTRACT

An optical element includes a lens base and an antireflection film arranged on a surface of the lens base. The antireflection film includes a multilayer film including a layer formed of a silicon oxide film and a layer formed of a tantalum oxide film, the layer formed of the silicon oxide film and the layer formed of the tantalum oxide film being stacked. The antireflection film further includes an inner layer arranged on a surface of the multilayer film, the inner layer being formed of a magnesium fluoride film, and an outer layer arranged on a surface of the inner layer, the outer layer being formed of a silicon oxide film.

16 Claims, 8 Drawing Sheets

(58) Field of Classification Search
CPC .. G02B 27/023; G02B 27/126; G02B 27/145;
G02B 27/22; G02B 27/2207; G02B
27/2228; G02B 27/4294; G02B 27/46;
G02B 3/0018; G02B 3/0031; G02B
3/0056; G02B 3/0068; G02B 3/0087;
G02B 3/08; G02B 5/003; G02B 5/02;
G02B 5/0215; G02B 5/0221; G02B
5/0268; G02B 5/04; G02B 5/0833; G02B
5/0841; G02B 5/0858; G02B 5/1814;
G02B 5/20; G02B 5/205; G02B 5/207;
G02B 5/23; G02B 5/28; G02B 5/281;
G02B 5/3033; G02B 6/005; G02B
6/0051; G02B 6/0055; G02B 6/0068;
G02B 6/0073; G02B 6/322; G02B 6/325;
G02B 6/3518; G02B 7/021; G02B 9/34;
G02B 9/36; G02B 9/60; G02B 9/62;
G02B 9/64; G02C 2202/16; G02C 7/022;
G02C 7/02; G02C 7/10; G02C 7/102;
G02C 7/108; G02C 7/104; G02C 7/105;
G02C 7/107; G02C 7/12; C03C
2217/734; C03C 17/007; C03C 2217/475;
C03C 2218/113; C03C 17/3417; C03C
17/366; C03C 17/3681; C03C 17/42;
C03C 2217/45; C03C 2217/732; C03C
17/00; C03C 17/002; C03C 17/008; C03C
17/25; C03C 17/34; C03C 17/3435; C03C
17/3441; C03C 17/36; C03C 17/3618;
C03C 17/3626; C03C 17/3639; C03C
17/3644; C03C 17/3652; C03C 2217/43;
C03C 2217/445; C03C 2217/465; C03C
2217/478; C03C 2217/73; C03C 2217/76;
C03C 2217/78; C03C 2218/151; C03C
2218/1525; C03C 2218/32; Y10T
29/49826; Y10T 29/49885; Y10T
428/2495; Y10T 428/258; Y10T
428/31507; Y10T 428/31551; Y10T
428/31935; Y10T 156/10; Y10T
29/49128; Y10T 29/49888; Y10T
29/49982; Y10T 428/24942; Y10T
428/26; Y10T 428/265; Y10T 428/31598;
Y10T 428/31649; Y10T 428/31663; Y10T
428/31855; Y10T 428/31906; Y10T
428/31928; Y10T 428/31971
USPC .......................................................... 359/581
See application file for complete search history.

(56) References Cited

U.S. PATENT DOCUMENTS

| 2012/0026456 | A1* | 2/2012 | Nishimoto | ............ C23C 14/083 |
| --- | --- | --- | --- | --- |
| | | | | 351/159.01 |
| 2014/0376094 | A1 | 12/2014 | Bellman | |
| 2015/0285971 | A1* | 10/2015 | Nagaya | .................. G03B 11/00 |
| | | | | 348/294 |
| 2017/0151754 | A1* | 6/2017 | Yoshihiro | ................. B32B 7/02 |

FOREIGN PATENT DOCUMENTS

| EP | 1152263 A1 | 11/2001 |
| --- | --- | --- |
| JP | 2002-202401 A | 7/2002 |

* cited by examiner

OPTICAL ELEMENT AND METHOD FOR PRODUCING THE SAME

BACKGROUND OF THE INVENTION

Field of the Invention

The present disclosure relates to an optical element and a method for producing an optical element that includes a lens base and an antireflection film on a surface of the lens base, and to a method for producing an optical element.

Description of the Related Art

Optical elements, such as lenses, used for digital cameras and so forth usually include films having high optical transparency and low reflectance, i.e., antireflection films, arranged on their surfaces. To reduce the costs and weight of optical devices including optical elements, such as interchangeable lenses for digital cameras, resin lenses come into use instead of glass lenses. With the recent improvement of a technique for forming a resin lens, a demand for higher optical performance, and a demand for the miniaturization of an optical system, the use of large-curvature resin lenses each having a half aperture angle close to 45° has been studied.

A method for forming a multilayer film containing magnesium fluoride ($MgF_2$), serving as a low-refractive-index material, with a refractive index of 1.38 by a vacuum deposition process is commonly known as a method for forming an antireflection film on a glass lens.

To increase the strength of a $MgF_2$ film, however, a base needs to be heated to a high temperature (for example, about 300° C.) during the vapor deposition. This restricts the use of the $MgF_2$ film for a resin lens. Thus, $SiO_2$, serving as a low-refractive-index material that need not be heated, with a refractive index of 1.45 is commonly used as an antireflection film for a resin lens. However, $SiO_2$ has a higher refractive index than $MgF_2$ and thus has insufficient antireflection performance, disadvantageously leading to the formation of a ghost image.

Japanese Patent Laid-Open No. 2002-202401 discloses a technique for enabling the use of a $MgF_2$ film for a resin lens, the technique including forming a $MgF_2$ film on a film composed of an oxide of zirconium (Zr) or an oxide of titanium (Ti) by heating to a low temperature or without heating, and forming a $SiO_2$ film serving as the outermost layer.

However, the structure of the antireflection film disclosed in Japanese Patent Laid-Open No. 2002-202401 has the problem that an antireflection film on a lens base is cracked when exposed to a high-temperature environment (for example, 70° C.) because a $MgF_2$ film has a high tensile stress.

SUMMARY OF THE INVENTION

The present disclosure provides an optical element including a lens base and an antireflection film arranged on a surface of the lens base, in which the antireflection film includes a multilayer film arranged on the surface of the lens base, the multilayer film including one or more layers each formed of a silicon oxide film and one or more layers each formed of a tantalum oxide film, the one or more layers each formed of the silicon oxide film and the one or more layers each formed of the tantalum oxide film being stacked, an inner layer arranged on a surface of the multilayer film, the inner layer being formed of a magnesium fluoride film, and an outer layer arranged on a surface of the inner layer, the outer layer being formed of a silicon oxide film.

Further features of the present disclosure will become apparent from the following description of exemplary embodiments with reference to the attached drawings.

DESCRIPTION OF THE EMBODIMENTS

Embodiments of the present disclosure will be described in detail below with reference to the attached drawings.

First Embodiment

Figure 1:
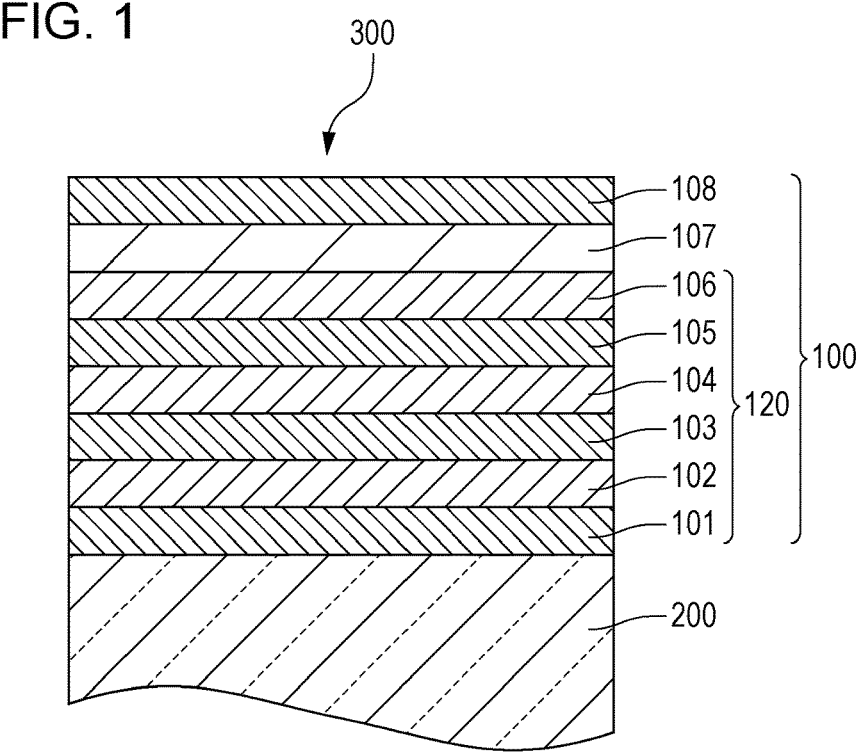
FIG. 1 is a fragmentary cross-sectional view of an optical element according to a first embodiment.

FIG. 1 is a fragmentary cross-sectional view of an optical element according to a first embodiment. An optical element 300 includes a lens (resin lens) 200 serving as a lens base and being composed of a resin, and an antireflection film 100 arranged on a surface of the resin lens 200.

The resin lens 200 is a lens with curvature. The resin lens 200 according to the first embodiment has a half aperture angle of 45°. The antireflection film 100 includes a multilayer film 120 including thin layers and being arranged on a surface of the resin lens 200, and two thin layers 107 and 108 arranged on a surface of the multilayer film 120. Regarding the two thin layers 107 and 108, the thin layer 107 is an inner layer arranged at an inner position with respect to the thin layer 108, and the thin layer 108 is an outer layer arranged at an outer position with respect to the inner layer 107. The outer layer 108 is the outermost layer in the first embodiment.

The multilayer film 120 includes layers each formed of a silicon oxide ($SiO_2$) film and layers each formed of a tantalum oxide ($Ta_2O_5$) film, the silicon oxide films and the tantalum oxide films being stacked. The multilayer film 120 in the first embodiment includes six layers in which the layers formed of the silicon oxide films and the layers formed of the tantalum oxide films are alternately stacked in this order from the surface of the resin lens 200.

The inner layer 107 is arranged on the surface of the multilayer film 120 and formed of a magnesium fluoride ($MgF_2$) film. The outer layer 108 is arranged on a surface of the inner layer 107 and formed of a silicon oxide ($SiO_2$) film. The antireflection film 100 in the first embodiment includes eight layers including the multilayer film 120 that includes six layers, the inner layer 107, and the outer layer 108.

The multilayer film 120 includes a first layer 101, a second layer 102, a third layer 103, a fourth layer 104, a fifth layer 105, and a sixth layer 106 stacked in this order from the surface side of the resin lens 200. The first layer 101 is formed of a silicon oxide film. The second layer 102 is formed of a tantalum oxide film. The third layer 103 is formed of a silicon oxide film. The fourth layer 104 is formed of a tantalum oxide film. The fifth layer 105 is formed of a silicon oxide film. The sixth layer 106 is formed of a tantalum oxide film. The inner layer 107 (a seventh layer) formed of a magnesium fluoride film is stacked on a surface of the sixth layer 106. The outer layer 108 (an eighth layer) formed of a silicon oxide film is stacked on a surface of the inner layer 107 serving as the seventh layer.

The silicon oxide films serving as the first layer 101, the third layer 103, the fifth layer 105, and the outer layer 108 that is the eighth layer are low-refractive-index layers and each have a refractive index of 1.45 or more and 1.50 or less. The tantalum oxide films serving as the second layer 102, the fourth layer 104, and the sixth layer 106 are high-refractive-index layers and each have a refractive index of 2.00 or more and 2.30 or less. The magnesium fluoride film serving as the inner layer 107 that is the seventh layer has a refractive index of 1.38 or more and 1.41 or less.

The first layer 101 in contact with the resin lens 200 is composed of $SiO_2$ having a refractive index of 1.45 or more and 1.50 or less. In this case, when the resin has a refractive index of 1.55 or less, the first layer 101 has only a small effect on reflectance. Thus, a material for the resin lens 200 is a resin having a refractive index of 1.48 or more and 1.55 or less. As the resin having the refractive index, a cycloolefin polymer resin (COP resin having a refractive index of 1.54) or a PMMA resin having a refractive index of 1.49 may be used. The material of the resin lens 200 is a COP resin having a refractive index of 1.54 (trade name: ZEONEX (registered trademark) E48R) in the first embodiment.

Figure 2:
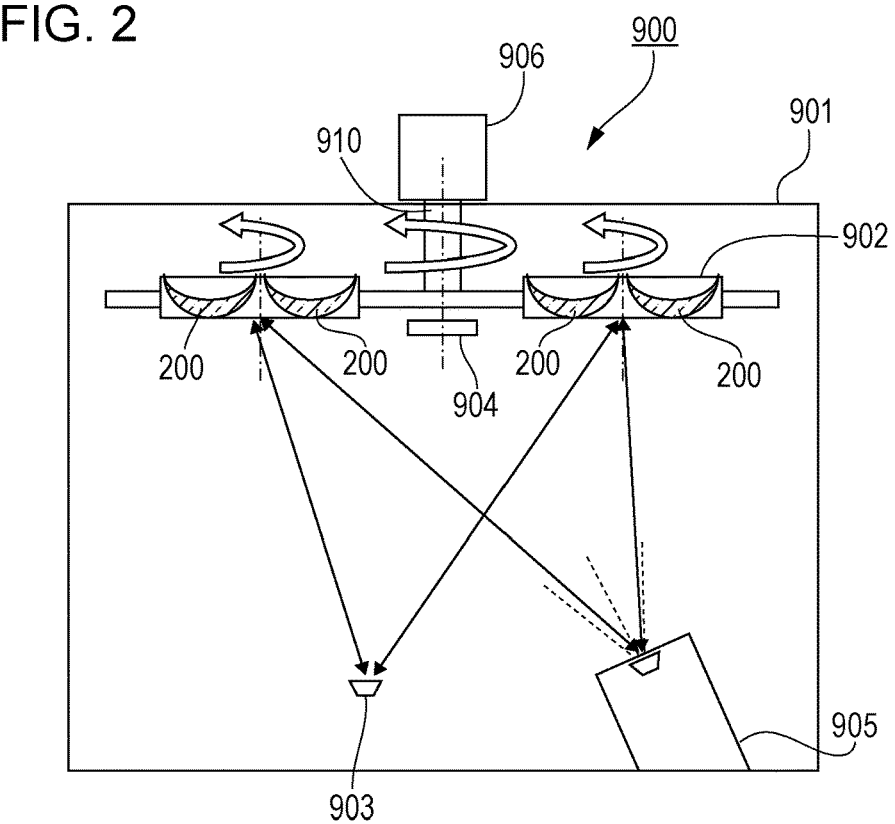
FIG. 2 is a schematic view of a vacuum deposition apparatus as an example of a film-forming apparatus according to the first embodiment.

The structure of a film-forming apparatus and a process in the first embodiment will be described below. FIG. 2 is a schematic view of a vacuum deposition apparatus as an example of the film-forming apparatus according to the first embodiment. A vacuum deposition apparatus 900 includes a vacuum chamber 901 configured to be evacuated with a vacuum pump (not illustrated) and a deposition jig (base holder) 902 that is arranged in the vacuum chamber 901 and that is rotatable about a shaft 910. The vacuum deposition apparatus 900 includes a driving mechanism 906 that rotationally drives the deposition jig 902. The vacuum deposition apparatus 900 includes an ion gun 905, W liners 903, and a quartz crystal thickness sensor 904. The vacuum deposition apparatus 900 includes an Ar introduction line (not illustrated) that introduces Ar gas into the vacuum chamber 901 and an $O_2$ introduction line (not illustrated) that introduces $O_2$ gas serving as an assist gas into the vacuum chamber 901.

A vacuum deposition apparatus manufactured by Shin-Maywa Industries, Ltd. was used as the vacuum deposition apparatus 900. Basic specifications of the vacuum deposition apparatus are listed below.

Vacuum chamber: inside diameter 1600 mm, effective height 1540 mm

Deposition jig: 1400-mm-diameter dome, 600-mm-diameter jig, rotatable and revolvable for each jig, revolvable at 3 to 15 rpm Evaporation source: 10-kW electron gun Ion gun: end hole type ion gun Thickness control: control of deposition rate and thickness with quartz crystal thickness sensor Introduction gas: oxygen and argon (in ion gun), oxygen (in chamber)

A method for producing the optical element 300 will be described below. The resin lens (lens base) 200 is placed on the deposition jig 902 in the vacuum chamber 901. Granular $SiO_2$, $MgF_2$, and $Ta_2O_5$ serving as vapor deposition materials are placed in the W liners 903 (40 mm in diameter×20 mm in thickness). The required number of the W liners is mounted on an electron gun crucible exchange mechanism. The quartz crystal thickness sensor 904 to monitor the thickness is arranged in a central opening portion of the deposition jig 902. The vacuum chamber 901 is evacuated to a high-vacuum region (about a pressure of $2\times10^3$ Pa) without heating. After confirming that the vacuum chamber 901 is in a high-vacuum state, Ar serving as an inert gas is introduced into the ion gun 905, and the ion gun 905 is discharged.

After the ion gun 905 is in a stable state, oxygen is introduced into the vacuum chamber 901. Ion-assisted deposition with oxygen ions is performed at a vacuum pressure of about $1\times10^{-2}$ (Pa) to form the antireflection film 100.

Figure 3:
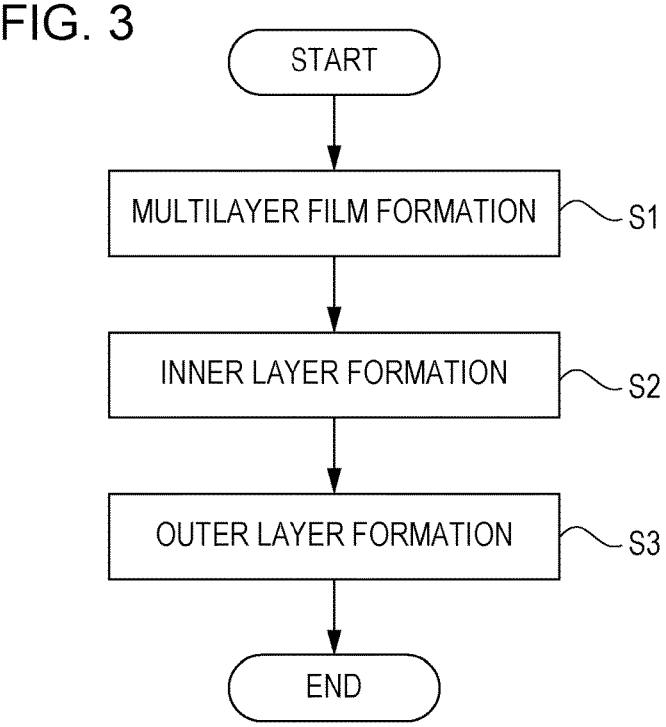
FIG. 3 is a flow chart of film-forming steps in the method for producing an optical element according to the first embodiment.

A step of forming the antireflection film 100 will be specifically described. FIG. 3 is a flow chart of film-forming steps in the method for producing an optical element according to the first embodiment. The multilayer film 120 is formed on a surface of the resin lens 200, the multilayer film 120 including a layer formed of a silicon oxide film and a layer formed of a tantalum oxide film, the layer formed of the silicon oxide film and the layer formed of the tantalum oxide film being stacked (S1: multilayer film formation step). At this time, these layers are sequentially formed from the side closer to the surface of the resin lens 200. The inner layer 107 formed of a magnesium fluoride film is formed on a surface of the multilayer film 120 (S2: inner layer formation step). The outer layer 108 formed of a silicon oxide film is formed on a surface of the inner layer 107 (S3: outer layer formation step). In these steps, although the layers may be formed by a vacuum deposition process, the layers are formed by an ion-assisted deposition process in the first embodiment. The outline of deposition conditions is summarized below.

TABLE 1

| Vapor deposition material | Deposition rate Å/s | Deposition pressure ×10⁻³ Pa | Introduced gas (In vacuum chamber) | Assist gas (Ion gun) | Ion current density *1 μA/cm² | Ion energy *2 eV |
|---|---|---|---|---|---|---|
| $SiO_2$ | 10 | 1.4 | oxygen | oxygen | 20-60 | 100-200 |
| $Ta_2O_5$ | 2 | 1.5 | oxygen | oxygen | 20-60 | 100-200 |
| $MgF_2$ | 2 | 1.0 | — | oxygen | 20-60 | 100-200 |
| $TiO_2$ | 3 | 1.5 | oxygen | oxygen | 20-60 | 100-200 |

*1 Ion current density values are measured values obtained with a Faraday cup at a position of a substrate.
*2 Ion energy values are estimates from the acceleration voltage (V) of an ion gun.

To achieve a uniform thickness of the antireflection film, the deposition may be performed while the deposition jig 902 is revolved at about 10 to about 15 (rpm). The antireflection film 100 is formed on the surface (one side) of the resin lens 200 under the conditions. If necessary, after the resin lens 200 is reversed, the antireflection film 100 may also be formed on the backside. After the completion of the formation of the antireflection film 100 by vapor deposition, the vacuum chamber 901 is filled with air. Then the optical element is removed.

The inner layer 107 located outside the multilayer film 120 in the antireflection film 100 has a low refractive index of 1.38 or more and 1.41 or less because it is composed of $MgF_2$ and thus has good antireflection performance. However, the resin lens 200 cannot be heated to a high temperature (for example, 300° C.) in the production process. The antireflection film needs to be formed while the resin lens 200 is not heated (or is heated to a low temperature). If such a layer composed of $MgF_2$ is the outermost layer, the film has insufficient strength. The outer layer 108 in the first embodiment is formed on a surface of the inner layer 107 composed of a silicon oxide film to compensate for the insufficient strength of the film composed of $MgF_2$.

In the case where the film formation is performed by ion-assisted deposition, the $MgF_2$ film is covered with the $SiO_2$ film, thereby providing a barrier effect of preventing the occurrence of film absorption due to the elimination of $F_2$ from the $MgF_2$ film caused by charged particles. In particular, the barrier effect on the charged particles prevents the occurrence of film absorption due to the elimination of $F_2$ in double-sided film formation in which the entire multilayer film can be exposed to an atmosphere containing the charged particles after the deposition.

The inner layer 107 composed of $MgF_2$ has a high tensile stress. The tensile stress is not offset even if the outer layer 108 is composed of $SiO_2$ having a compressive stress. Thus, a material having a compressive stress is used in the multilayer film 120 in the first embodiment.

Table 2 summarizes the experimentally obtained relationship between various material films produced by different deposition processes and stresses in the films. Two types of deposition processes are used in the first embodiment: vacuum vapor deposition and ion-assisted deposition with oxygen ions.

TABLE 2

|  | Vacuum vapor deposition | Ion-assisted deposition (oxygen ion) Processable range |
|---|---|---|
| SiO | compressive | compressive (high) |
| $SiO_2$ | 0 to compressive | compressive |
| $Ta_2O_5$ | compressive/tensile | compressive |

TABLE 2-continued

|  | Vacuum vapor deposition | Ion-assisted deposition (oxygen ion) Processable range |
|---|---|---|
| $TiO_2$ | tensile (high) | tensile (low) |
| $OH_5$ ($ZrO_2/TiO_2$) | tensile (high) | tensile |
| $MgF_2$ | tensile (high) | tensile (high) |

Examples of a high-refractive-index material that may be used for a resin lens include $TiO_2$, $ZrO_2$, $Ta_2O_5$, and mixtures thereof, which exhibit good strength and refractive indices even when they are formed into films without heating. The results listed in Table 1 indicate that the film composed of an oxide of titanium or zirconium ($TiO_2$, $ZrO_2$, or a mixture thereof) serving as the multilayer film 120 has a tensile stress, and thus the tensile stress of the $MgF_2$ film is not offset by the film even if the film is formed by the vacuum vapor deposition or the ion-assisted deposition.

The vacuum vapor deposition enables a $Ta_2O_5$ film to have a low tensile stress to a compressive stress. In particular, the ion-assisted deposition enables the $Ta_2O_5$ film to have a compressive stress. Thus, the tensile stress of the $MgF_2$ film is relaxed by the compressive stress of the multilayer film 120, compared with the case where another high-refractive-index material, for example, $TiO_2$ or $ZrO_2$, is used. As described above, the use of the $Ta_2O_5$ film enhances the compressive stress of a $SiO_2$ film and thus is highly effective in relaxing the tensile stress of the $MgF_2$ film. This leads to the antireflection film 100 having high crack resistance. A SiO film may be used instead of the $SiO_2$ film used for the outer layer or the multilayer film.

When an antireflection film is formed on a resin lens (lens base) having a curvature by a vacuum vapor deposition method, the thickness of the antireflection film is geometrically reduced by cos θ where θ denotes a half aperture angle to the lens base. For example, in the case of a large-curvature lens base having a half aperture angle θ of 45°, the thickness of the antireflection film in the peripheral area of the lens base is about 30% smaller than that of the antireflection film in the central area of the lens base. It is thus necessary to inhibit the formation of a red ghost image due to the degradation of antireflection performance in the peripheral area of the high-curvature lens base.

As a method for reducing variations in reflectance in the periphery of the lens, improvement in the performance of an antireflection film itself is effective. In other words, a wide-range antireflection film having antireflection performance from the visible region with a wavelength of about 430 nm to the near-infrared region with a wavelength of about 900 nm is effectively used.

The design of a broadband antireflection film and a specific film structure to reduce the occurrence of a red ghost image in the peripheral area are studied in the first embodiment.

Figure 4:
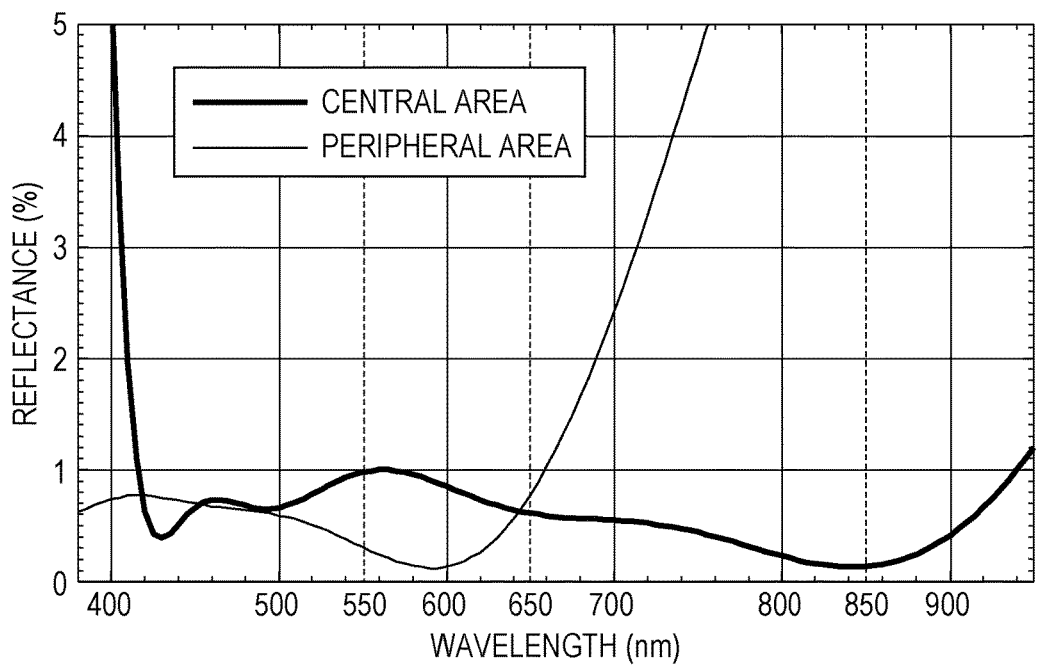
FIG. 4 is a graph depicting spectral reflectance properties in the central area and the peripheral area of a lens in the first embodiment.

Table 3 summarizes the film structure of the eight-layer antireflection film of the first embodiment. FIG. 4 is a graph depicting spectral reflectance properties in the central area and the peripheral area (half aperture angle: 45°) of the lens in the first embodiment.

TABLE 3

Design reference wavelength λ0: 550 nm
Incident angle θ: 0°

| Layer | Material | Refractive index n | Optical thickness n × d |
|---|---|---|---|
| Base | COP resin | 1.54 | |
| First layer | $SiO_2$ | 1.47 | 0.55 × λ0 |
| Second layer | $Ta_2O_5$ | 2.12 | 0.07 × λ0 |
| Third layer | $SiO_2$ | 1.47 | 0.10 × λ0 |
| Fourth layer | $Ta_2O_5$ | 2.12 | 0.23 × λ0 |
| Fifth layer | $SiO_2$ | 1.47 | 0.07 × λ0 |
| Sixth layer | $Ta_2O_5$ | 2.12 | 0.14 × λ0 |
| Seventh layer | $MgF_2$ | 1.39 | 0.17 × λ0 |
| Eighth layer | $SiO_2$ | 1.47 | 0.11 × λ0 |
| Medium | air | 1.00 | |

Figure 7:
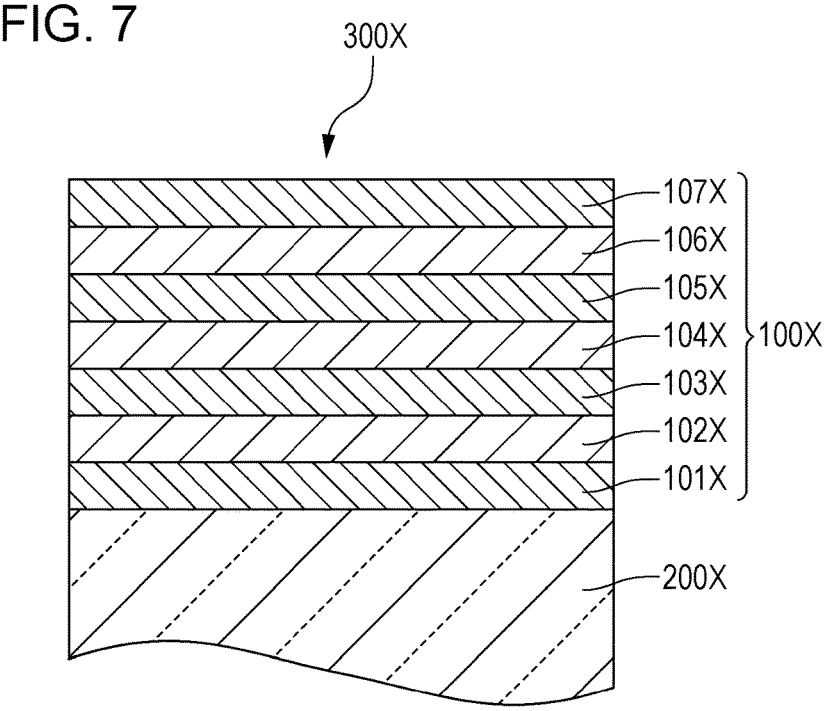
FIG. 7 is a fragmentary cross-sectional view of an optical element according to a first comparative embodiment.

FIG. 7 is a fragmentary cross-sectional view of an optical element according to a first comparative embodiment. An optical element 300X includes a lens (resin lens) 200X serving as a lens base and being composed of a resin, and an antireflection film 100X arranged on a surface of the resin lens 200X.

The antireflection film 100X includes a first layer 101X to a seventh layer 107X. The first layer 101X, a third layer 103X, a fifth layer 105X, and a seventh layer 107X are each formed of a film composed of $SiO_2$. A second layer 102X, a fourth layer 104X, and a sixth layer 106X are each formed of a film composed of $Ta_2O_5$. The antireflection film 100X in the first comparable embodiment includes the seven layers that do not contain $MgF_2$.

Figure 8:
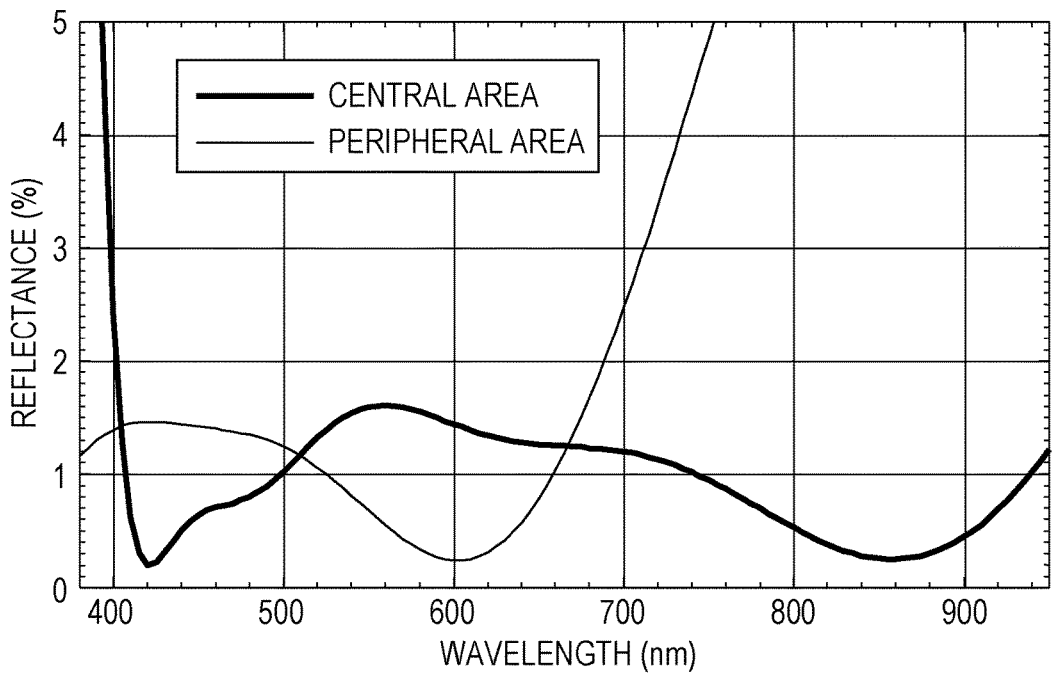
FIG. 8 is a graph depicting spectral reflectance properties in the central area and the peripheral area of a lens in the first comparative embodiment.

Table 4 summarizes the film structure of the seven-layer antireflection film of the first comparative embodiment. FIG. 8 is a graph depicting spectral reflectance properties in the central area and the peripheral area (half aperture angle: 45°) of the lens in the first comparative embodiment.

TABLE 4

Design reference wavelength λ0: 550 nm
Incident angle θ: 0°

| Layer | Material | Refractive index n | Optical thickness n × d |
|---|---|---|---|
| Base | COP resin | 1.54 | |
| First layer | $SiO_2$ | 1.47 | 0.55 × λ0 |
| Second layer | $Ta_2O_5$ | 2.12 | 0.07 × λ0 |
| Third layer | $SiO_2$ | 1.47 | 0.10 × λ0 |
| Fourth layer | $Ta_2O_5$ | 2.12 | 0.23 × λ0 |
| Fifth layer | $SiO_2$ | 1.47 | 0.07 × λ0 |
| Sixth layer | $Ta_2O_5$ | 2.12 | 0.14 × λ0 |
| Seventh layer | $SiO_2$ | 1.47 | 0.29 × λ0 |
| Medium | air | 1.00 | |

The results illustrated in FIG. 4 indicate that the reflectance is 1% or less and the reflected color is green in the central area of the lens at a wavelength of 420 nm to 900 nm in the first embodiment. In contrast, the results illustrated in FIG. 8 indicate that in the case where the reflected color is adjusted to green in the first comparative embodiment, the reflectance is entirely higher than that in the first embodiment and in particular, the reflectance is high at about 550 nm where the luminosity function is high.

Here, a wavelength (design reference wavelength) is denoted by λ. The layers 101 to 108 have respective refractive indices of n1, n2, n3, n4, n5, n6, n7, and n8 and physical thicknesses of d1, d2, d3, d4, d5, d6, d7, and d8, in this order from the layer on the surface of the resin lens 200.

The results listed in Table 3 indicate that the thickness range of the antireflection film 100 is preferably within ±30% in view of optical performance. The results illustrated in FIG. 4 indicate that the antireflection effect is maintained even if the thickness of the antireflection film 100 in the peripheral area of the lens is reduced by about 30%. That is, the antireflection film 100 preferably meets the following requirements:

$1.45 \le n1 \le 1.50$ and $0.39 \times \lambda 0 \le n1 \times d1 \le 0.72 \times \lambda 0$,
$2.00 \le n2 \le 2.30$ and $0.05 \times \lambda 0 \le n2 \times d2 \le 0.09 \times \lambda 0$,
$1.45 \le n3 \le 1.50$ and $0.07 \times \lambda 0 \le n3 \times d3 \le 0.13 \times \lambda 0$,
$2.00 \le n4 \le 2.30$ and $0.16 \times \lambda 0 \le n4 \times d4 \le 0.30 \times \lambda 0$,
$1.45 \le n5 \le 1.50$ and $0.05 \times \lambda 0 \le n5 \times d5 \le 0.09 \times \lambda 0$,
$2.00 \le n6 \le 2.30$ and $0.10 \times \lambda 0 \le n6 \times d6 \le 0.19 \times \lambda 0$,
$1.38 \le n7 \le 1.41$ and $0.12 \times \lambda 0 \le n7 \times d7 \le 0.22 \times \lambda 0$, and
$1.45 \le n8 \le 1.50$ and $0.07 \times \lambda 0 \le n8 \times d8 \le 0.14 \times \lambda 0$.

The thickness of each of the layers 101 to 108 may be adjusted in the range of ±30% in view of the control of the lens form, the optical characteristics, and so forth.

The thickness range of the antireflection film 100 is more preferably within ±10% in view of optical performance. That is the antireflection film 100 more preferably meets the following requirements:
$0.50 \times \lambda 0 \le n1 \times d1 \le 0.61 \times \lambda 0$,
$0.06 \times \lambda 0 \le n2 \times d2 \le 0.08 \times \lambda 0$,
$0.09 \times \lambda 0 \le n3 \times d3 \le 0.11 \times \lambda 0$,
$0.21 \times \lambda 0 \le n4 \times d4 \le 0.25 \times \lambda 0$,
$0.06 \times \lambda 0 \le n5 \times d5 \le 0.07 \times \lambda 0$,
$0.13 \times \lambda 0 \le n6 \times d6 \le 0.16 \times \lambda 0$,
$0.15 \times \lambda 0 \le n7 \times d7 \le 0.19 \times \lambda 0$, and
$0.10 \times \lambda 0 \le n8 \times d8 \le 0.12 \times \lambda 0$.

The thickness of each of the layers 101 to 108 may be adjusted in the range of ±10% in view of the control of the lens form, the optical characteristics, and so forth.

The layers preferably meet the above requirements in a range of from 400 nm to 700 nm.

In the first embodiment, in particular, the thickness of the first layer 101 that has only a small effect on optical performance is larger than those of the layers 102 to 106, so that the compressive stress of the entire multilayer film 120 is increased, thereby reducing the effect of the expansion of the resin lens 200.

The spectral reflectance of the antireflection film 100 will be described below. The reflectance of the antireflection film 100 at a wavelength of 550 nm is denoted by R550. The reflectance of the antireflection film 100 at a wavelength of 650 nm is denoted by R650. The reflectance of the antireflection film 100 at a wavelength of 850 nm is denoted by R850.

Regarding the relationship among the reflectances at wavelengths of 550 nm, 650 nm, and 850 nm, when R550<R650, a reflected color in the central area of the lens is a reddish color, which may not be used. The results illustrated in FIG. 4 indicate that R550≥R650 may be used. When R650<R850, an antireflection band is narrow, which means the degradation of the antireflection performance due to nonuniformity in thickness. The results illustrated in FIG. 4 indicate that R650≥R850 may be used. When R850 is 1% or less (i.e., R850≤1%), in the case of a resin lens having a curvature so as to have a half aperture angle of 45° or less, the effect of improving the nonuniformity in thickness should be provided.

The results illustrated in FIGS. 4 and 8 indicate that when R550 is 1.5% or less (i.e., 1.5%≥R550), the antireflection effect of the antireflection film 100 according to the first embodiment is superior to that of the first comparative embodiment.

The antireflection film 100 may have a reflectance that meets 1.5%≥R550≥R650≥R850, and R850≤1% in the central area of the resin lens (lens base) 200.

Figure 9:
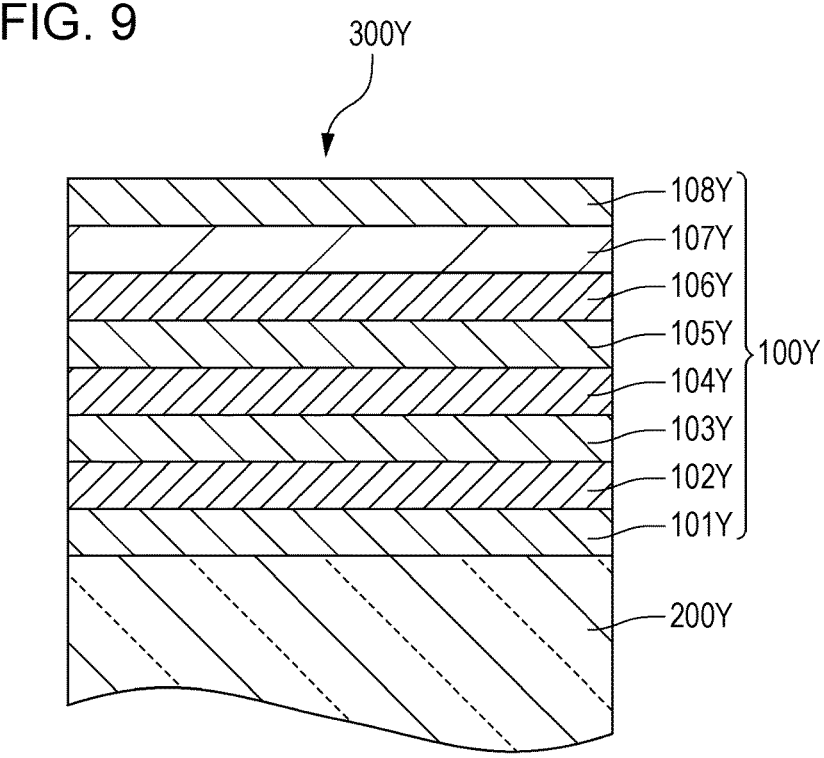
FIG. 9 is a fragmentary cross-sectional view of an optical element according to a second comparative embodiment.

FIG. 9 is a fragmentary cross-sectional view of an optical element according to a second comparative embodiment. An optical element 300Y includes a lens (resin lens) 200Y serving as a lens base and being composed of a resin and an antireflection film 100Y arranged on a surface of the resin lens 200Y.

The antireflection film 100Y includes a first layer 101Y to an eighth layer 108Y. The first layer 101Y, a third layer 103Y, a fifth layer 105Y, and the eighth layer 108Y are each formed of a film composed of $SiO_2$. A second layer 102Y, a fourth layer 104Y, and a sixth layer 106Y are each formed of a film composed of $TiO_2$. The antireflection film 100Y in the second comparative embodiment includes the eight layers composed of $TiO_2$ instead of $Ta_2O_5$.

Figure 10:
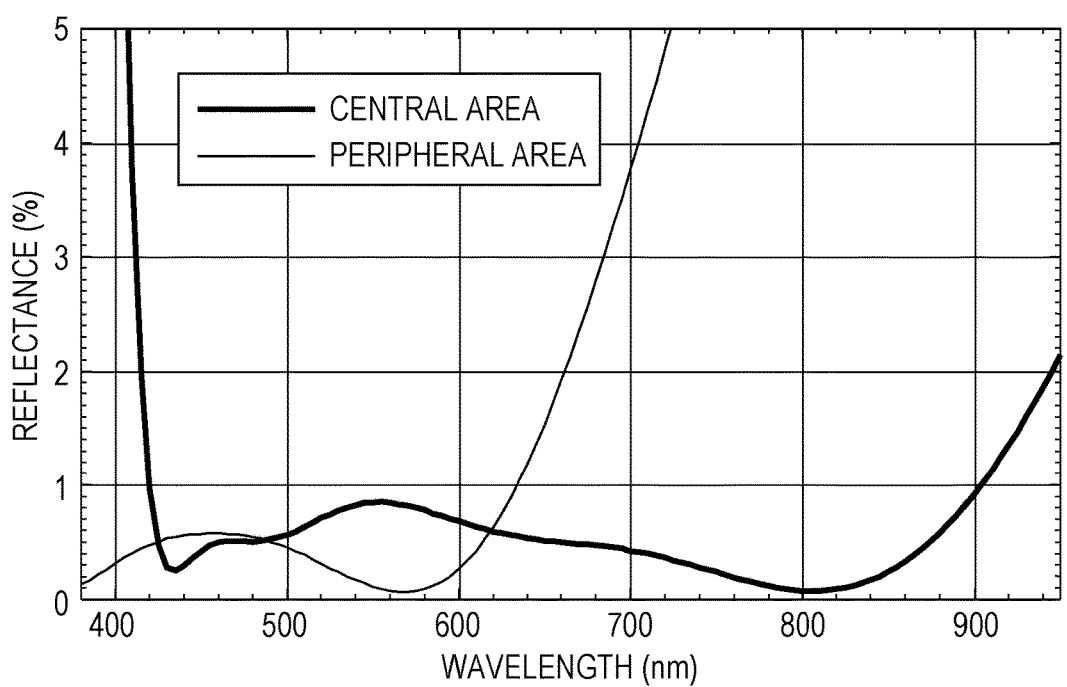
FIG. 10 is a graph depicting spectral reflectance properties in the central area and the peripheral area of a lens in the second comparative embodiment.

Table 5 summarizes the film structure of the eight-layer antireflection film of the second comparative embodiment. FIG. 10 is a graph depicting spectral reflectance properties in the central area and the peripheral area (half aperture angle: 45°) of the lens in the second comparative embodiment.

TABLE 5

Design reference wavelength λ0: 550 nm
Incident angle θ: 0°

| Layer | Material | Refractive index n | Optical thickness n × d |
|---|---|---|---|
| Base | COP resin | 1.54 | |
| First layer | $SiO_2$ | 1.47 | 0.55 × λ0 |
| Second layer | $TiO_2$ | 2.19 | 0.07 × λ0 |
| Third layer | $SiO_2$ | 1.47 | 0.10 × λ0 |
| Fourth layer | $TiO_2$ | 2.19 | 0.23 × λ0 |
| Fifth layer | $SiO_2$ | 1.47 | 0.07 × λ0 |
| Sixth layer | $TiO_2$ | 2.19 | 0.14 × λ0 |
| Seventh layer | $MgF_2$ | 1.39 | 0.18 × λ0 |
| Eighth layer | $SiO_2$ | 1.47 | 0.11 × λ0 |
| Medium | air | 1.00 | |

The measurement of reflectance and transmittance with a spectrophotometer, the evaluation of film adhesion by a tape peel method, the evaluation of film strength by a rubbing test, and an environmental test were performed. Items and conditions in the environmental test are listed below.

TABLE 6

| Exposure to high temperature | Thermal shock | Exposure to low temperature | High temperature and high humidity |
|---|---|---|---|
| 70° C. 12 h | −30° C. 2 h/ 60° C. 60% 2 h 10 cycle | −30° C. 1000 h | 60° C. 90% 1000 h |

Table 7 lists the evaluation results of the antireflection film of the first embodiment, the antireflection film including the second layer 102, the fourth layer 104, and the sixth layer 106 that serve as high-refractive-index layers and that are formed of the $Ta_2O_5$ films.

TABLE 7

| Exposure to high temperature | Thermal shock | Exposure to low temperature | High temperature and high humidity |
|---|---|---|---|
| 70° C. 12 h | −30° C. 2 h/ 60° C. 60% 2 h 10 cycle | −30° C. 1000 h | 60° C. 90% 1000 h |
| OK | OK | OK | OK |

| Reflected color | Measured value of reflectance (one side) | Film adhesion | Film strength |
|---|---|---|---|
| green | R550 = 1.0%, R650 = 0.8%, R850 = 0.3% | tape test (5 times): not peeled | rubbing with Silbon paper (10 times at 1.96 N): not scratched |
| OK | OK | OK | OK |

Table 8 lists the evaluation results of the antireflection film of the second comparative embodiment, the antireflection film including the second layer 102Y, the fourth layer 104Y, and the sixth layer 106Y that serve as high-refractive-index layers and that are formed of the $TiO_2$ films.

TABLE 8

| Exposure to high temperature | Thermal shock | Exposure to low temperature | High temperature and high humidity |
|---|---|---|---|
| 70° C. 12 h | −30° C. 2 h/ 60° C. 60% 2 h 10 cycle | −30° C. 1000 h | 60° C. 90% 1000 h |
| NG | NG (crack formation in film) | OK | OK |

| Reflected color | Measured value of reflectance (one side) | Film adhesion | Film strength |
|---|---|---|---|
| green | R550 = 0.9%, R650 = 0.5%, R850 = 0.3% | tape test (5 times): not peeled | rubbing with Silbon paper (10 times at 1.96 N): not scratched |
| OK | OK | OK | OK |

The foregoing results indicate that although satisfactory optical performance is obtained in any case of the high-refractive-index layers composed of $Ta_2O_5$ or $TiO_2$, $Ta_2O_5$ may be used from the results of exposure to a high temperature and thermal shock. Specifically, even if the optical element 300 is exposed to a high-temperature environment (for example, 70° C.) in a vehicle or the like, little or no cracking occurs in the antireflection film 100.

Accordingly, the high-performance optical element 300 is produced in the first embodiment, in which even in the case of the optical element 300 including the high-curvature resin lens 200, the antireflection film 100 has an effectively reduced difference in reflectance between the peripheral area and the central area, and little or no cracking occurs in the antireflection film 100 even at a high temperature.

Second Embodiment

Figure 5:
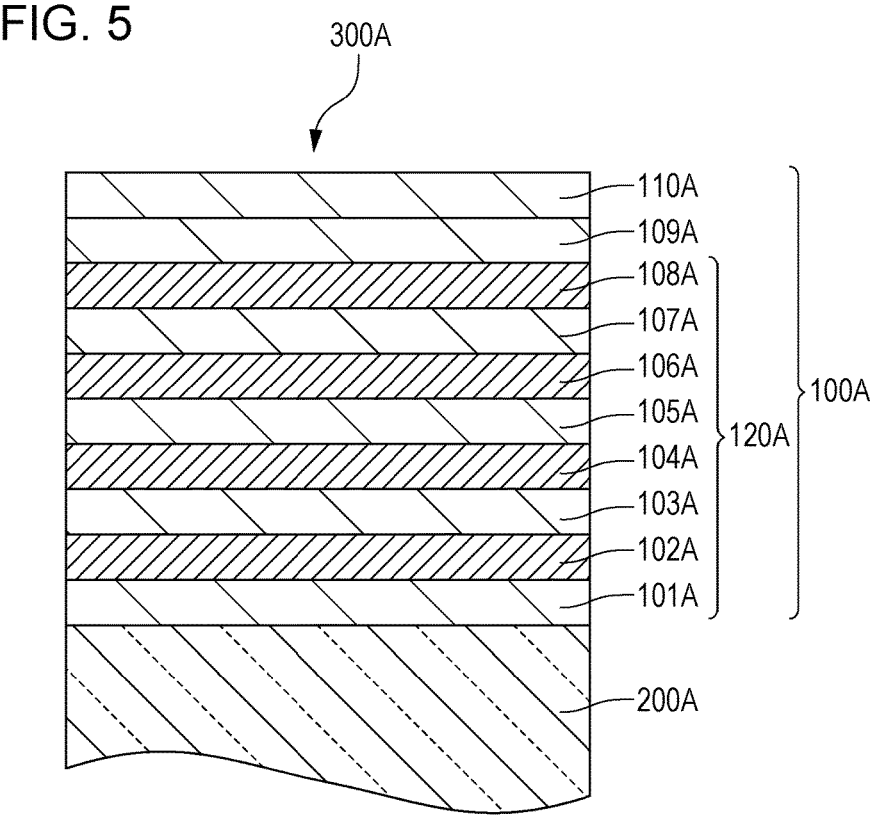
FIG. 5 is a fragmentary cross-sectional view of an optical element according to a second embodiment.

FIG. 5 is a fragmentary cross-sectional view of an optical element according to a second embodiment. An optical element 300A includes a lens (resin lens) 200A serving as a lens base and being composed of a resin, and an antireflection film 100A arranged on a surface of the resin lens 200A.

The resin lens 200A is a lens with curvature. The resin lens 200A according to the second embodiment has a half aperture angle of 45°. The antireflection film 100A includes a multilayer film 120A including thin layers an being arranged on a surface of the resin lens 200A, and two thin layers 109A and 110A arranged on a surface of the multilayer film 120A. Regarding the two thin layers 109A and 110A, the thin layer 109A is an inner layer arranged at an inner position with respect to the thin layer 110A, and the thin layer 110A is an outer layer arranged at an outer position with respect to the inner layer 109A. The outer layer 110A is the outermost layer in the second embodiment.

The multilayer film 120A includes layers each formed of a silicon oxide ($SiO_2$) film and layers each formed of a tantalum oxide ($Ta_2O_5$) film, the silicon oxide films and the tantalum oxide films being stacked. The multilayer film 120A in the second embodiment includes eight layers in which the layers formed of the silicon oxide films and the layers formed of the tantalum oxide films are alternately stacked in this order from the surface of the resin lens 200A.

The inner layer 109A is arranged on the surface of the multilayer film 120A and formed of a magnesium fluoride ($MgF_2$) film. The outer layer 110A is arranged on a surface of the inner layer 109A and formed of a silicon oxide ($SiO_2$) film. The antireflection film 100A in the second embodiment includes ten layers including the multilayer film 120A that includes eight layers, the inner layer 109A, and the outer layer 110A.

The multilayer film 120A includes a first layer 101A, a second layer 102A, a third layer 103A, a fourth layer 104A, a fifth layer 105A, a sixth layer 106A, a seventh layer 107A, and an eighth layer 108A stacked in this order from the surface side of the resin lens 200A. The first layer 101A is formed of a silicon oxide film. The second layer 102A is formed of a tantalum oxide film. The third layer 103A is formed of a silicon oxide film. The fourth layer 104A is formed of a tantalum oxide film. The fifth layer 105A is formed of a silicon oxide film. The sixth layer 106A is formed of a tantalum oxide film. The seventh layer 107A is formed of a silicon oxide film. The eighth layer 108A is formed of a tantalum oxide film. The inner layer 109A (a ninth layer) formed of a magnesium fluoride film is stacked on a surface of the eighth layer 108A. The outer layer 110A (a tenth layer) formed of a silicon oxide film is stacked on a surface of the inner layer 109A serving as the ninth layer.

The silicon oxide films serving as the first layer 101A, the third layer 103A, the fifth layer 105A, the seventh layer 107A, and the outer layer 110A that is the tenth layer are low-refractive-index layers and each have a refractive index of 1.45 or more and 1.50 or less. The tantalum oxide films serving as the second layer 102A, the fourth layer 104A, the sixth layer 106A, and the eighth layer 108A are high-refractive-index layers and each have a refractive index of 2.00 or more and 2.30 or less. The magnesium fluoride film serving as the inner layer 109A that is the ninth layer has a refractive index of 1.38 or more and 1.41 or less.

The first layer 101A in contact with the resin lens 200A is composed of $SiO_2$ having a refractive index of 1.45 or more and 1.50 or less. In this case, when the resin has a refractive index of 1.55 or less, the first layer 101A has only a small effect on reflectance. Thus, a material for the resin lens 200A is a resin having a refractive index of 1.48 or more and 1.55 or less. As the resin having the refractive index, a cycloolefin polymer resin (COP resin having a refractive index of 1.54) or a PMMA resin having a refractive index of 1.49 may be used. The material of the resin lens 200A is a COP resin having a refractive index of 1.54 (trade name: ZEONEX (registered trademark) E48R) in the second embodiment.

The inner layer 109A located outside the multilayer film 120A has a low refractive index of 1.38 or more and 1.41 or less because it is composed of $MgF_2$ and thus has good antireflection performance. However, the resin lens 200A cannot be heated to a high temperature (for example, 300° C.) in the production process. The antireflection film needs to be formed while the resin lens 200A is not heated (or is heated to a low temperature). If such a layer composed of $MgF_2$ is the outermost layer, the film has insufficient strength. The outer layer 110A in the second embodiment is formed on a surface of the inner layer 109A composed of a silicon oxide film to compensate for the insufficient strength of the film composed of $MgF_2$.

In the case where the film formation is performed by ion-assisted deposition, the $MgF_2$ film is covered with the $SiO_2$ film, thereby providing a barrier effect of preventing the occurrence of film absorption due to the elimination of $F_2$ from the $MgF_2$ film caused by charged particles. In particular, the barrier effect on the charged particles prevents the occurrence of film absorption due to the elimination of $F_2$ in double-sided film formation in which the entire multilayer film can be exposed to an atmosphere containing the charged particles after the deposition The inner layer 109A composed of $MgF_2$ has a high tensile stress. The tensile stress is not offset even if the outer layer 110A is composed of $SiO_2$ having a compressive stress. Thus, a material having a compressive stress is used in the multilayer film 120A in the second embodiment.

Examples of a high-refractive-index material that may be used for a resin lens include $TiO_2$, $ZrO_2$, $Ta_2O_5$, and mixtures thereof, which exhibit good strength and refractive indices even when they are formed into films without heating. The results listed in Table 2 indicate that the film composed of an oxide of titanium or zirconium ($TiO_2$, $ZrO_2$, or a mixture thereof) serving as the multilayer film 120A has a tensile stress, and thus the tensile stress of the $MgF_2$ film is not offset by the film even if the film is formed by the vacuum vapor deposition or the ion-assisted deposition.

The vacuum vapor deposition enables a $Ta_2O_5$ film to have a low tensile stress to a compressive stress. In particular, the ion-assisted deposition enables the $Ta_2O_5$ film to have a compressive stress. Thus, the tensile stress of the $MgF_2$ film is relaxed by the compressive stress of the multilayer film 120A, compared with the case where another high-refractive-index material, for example, $TiO_2$ or $ZrO_2$, is used. As described above, the use of the $Ta_2O_5$ film enhances the compressive stress of a $SiO_2$ film and thus is highly effective in relaxing the tensile stress of the $MgF_2$ film. This leads to the antireflection film 100A having high crack resistance. A SiO film may be used instead of the $SiO_2$ film used for the outer layer or the multilayer film.

The design of a broadband antireflection film and a specific film structure to reduce the occurrence of a red ghost image in the peripheral area are studied.

Figure 6:
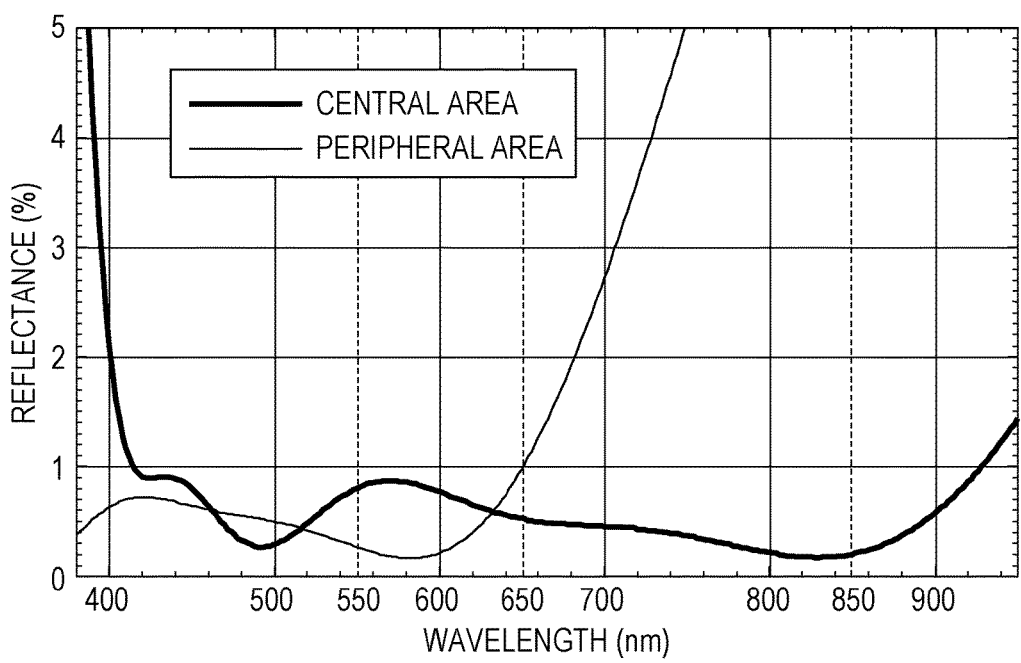
FIG. 6 is a graph depicting spectral reflectance properties in the central area and the peripheral area of a lens in the second embodiment.

Table 9 summarizes the film structure of the ten-layer antireflection film of the second embodiment. FIG. 6 is a graph depicting spectral reflectance properties in the central area and the peripheral area (half aperture angle: 45°) of the lens in the second embodiment.

TABLE 9

Design reference wavelength λ0: 550 nm
Incident angle θ: 0°

| Layer | Material | Refractive index n | Optical thickness n × d |
|---|---|---|---|
| Base | COP resin | 1.54 | |
| First layer | $SiO_2$ | 1.47 | 0.53 × λ0 |

TABLE 9-continued

Design reference wavelength λ0: 550 nm
Incident angle θ: 0°

| Layer | Material | Refractive index n | Optical thickness n × d |
|---|---|---|---|
| Second layer | Ta$_2$O$_5$ | 2.12 | 0.04 × λ0 |
| Third layer | SiO$_2$ | 1.47 | 0.09 × λ0 |
| Fourth layer | Ta$_2$O$_5$ | 2.12 | 0.09 × λ0 |
| Fifth layer | SiO$_2$ | 1.47 | 0.04 × λ0 |
| Sixth layer | Ta$_2$O$_5$ | 2.12 | 0.19 × λ0 |
| Seventh layer | SiO$_2$ | 1.47 | 0.06 × λ0 |
| Eighth layer | Ta$_2$O$_5$ | 2.12 | 0.12 × λ0 |
| Ninth layer | MgF$_2$ | 1.39 | 0.20 × λ0 |
| Tenth layer | SiO$_2$ | 1.47 | 0.06 × λ0 |
| Medium | air | 1.00 | |

Figure 11:
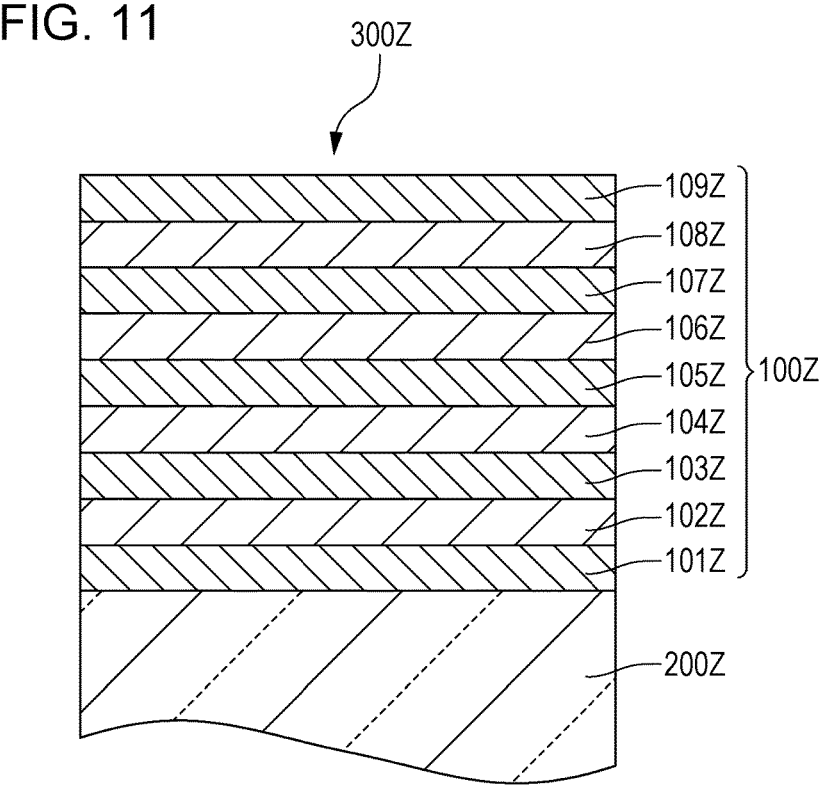
FIG. 11 is a fragmentary cross-sectional view of an optical element according to a third comparative embodiment.

FIG. 11 is a fragmentary cross-sectional view of an optical element according to a third comparative embodiment. An optical element 300Z includes a lens (resin lens) 200Z serving as a lens base and being composed of a resin, and an antireflection film 100Z arranged on a surface of the resin lens 200Z.

The antireflection film 100Z includes a first layer 101Z to a ninth layer 109Z. The first layer 101Z, a third layer 103Z, a fifth layer 105Z, a seventh layer 107Z, and the ninth layer 109Z are each formed of a film composed of SiO$_2$. A second layer 102Z, a fourth layer 104Z, a sixth layer 106Z, and an eighth layer 108Z are each formed of a film composed of Ta$_2$O$_5$. The antireflection film 100Z in the third comparative embodiment includes the nine layers that do not contain MgF$_2$.

Figure 12:
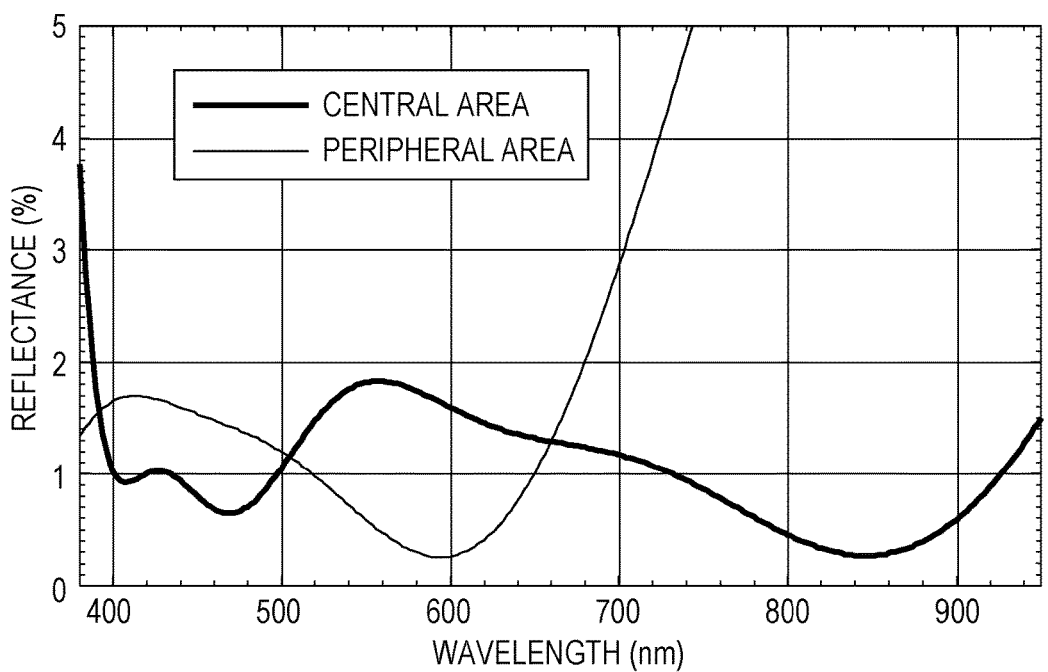
FIG. 12 is a graph depicting spectral reflectance properties in the central area and the peripheral area of a lens in the third comparative embodiment.

Table 10 summarizes the film structure of the nine-layer antireflection film of the third comparative embodiment. FIG. 12 is a graph depicting spectral reflectance properties in the central area and the peripheral area (half aperture angle: 45°) of the lens in the third comparative embodiment.

TABLE 10

Design reference wavelength λ0: 550 nm
Incident angle θ: 0°

| Layer | Material | Refractive index n | Optical thickness n × d |
|---|---|---|---|
| Base | COP resin | 1.54 | |
| First layer | SiO$_2$ | 1.47 | 0.53 × λ0 |
| Second layer | Ta$_2$O$_5$ | 2.12 | 0.04 × λ0 |
| Third layer | SiO$_2$ | 1.47 | 0.09 × λ0 |
| Fourth layer | Ta$_2$O$_5$ | 2.12 | 0.09 × λ0 |
| Fifth layer | SiO$_2$ | 1.47 | 0.04 × λ0 |
| Sixth layer | Ta$_2$O$_5$ | 2.12 | 0.19 × λ0 |
| Seventh layer | SiO$_2$ | 1.47 | 0.06 × λ0 |
| Eighth layer | Ta$_2$O$_5$ | 2.12 | 0.12 × λ0 |
| Ninth layer | SiO$_2$ | 1.47 | 0.06 × λ0 |
| Medium | air | 1.00 | |

The results illustrated in FIG. 6 indicate that the reflectance is 1% or less and the reflected color is green in the central area of the lens at a wavelength of 420 nm to 900 nm in the second embodiment. In contrast, the results illustrated in FIG. 12 indicate that in the case where the reflected color is adjusted to green in the third comparative embodiment, the reflectance is entirely higher than that in the second embodiment and in particular, the reflectance is high at about 550 nm where the luminosity function is high.

Here, a design reference wavelength is denoted by λ0. The layers 101A to 110A have respective refractive indices of n1, n2, n3, n4, n5, n6, n7, n8, n9, and n10 and physical thicknesses of d1, d2, d3, d4, d5, d6, d7, d8, d9, and d10, in this order from the layer on the surface of the resin lens 200A.

The results listed in Table 9 indicate that the antireflection film 100A is preferably within ±30% in view of optical performance. The results illustrated in FIG. 6 indicate that the antireflection effect is maintained even if the thickness of the antireflection film 100A in the peripheral area of the lens is reduced by about 30%. That is, the antireflection film 100A preferably meets the following requirements:

$1.45 \leq n1 \leq 1.50$ and $0.37 \times \lambda0 \leq n1 \times d1 \leq 0.69 \times \lambda0$,
$2.00 \leq n2 \leq 2.30$ and $0.03 \times \lambda0 \leq n2 \times d2 \leq 0.06 \times \lambda0$,
$1.45 \leq n3 \leq 1.50$ and $0.06 \times \lambda0 \leq n3 \times d3 \leq 0.12 \times \lambda0$,
$2.00 \leq n4 \leq 2.30$ and $0.06 \times \lambda0 \leq n4 \times d4 \leq 0.12 \times \lambda0$,
$1.45 \leq n5 \leq 1.50$ and $0.03 \times \lambda0 \leq n5 \times d5 \leq 0.06 \times \lambda0$,
$2.00 \leq n6 \leq 2.30$ and $0.13 \times \lambda0 \leq n6 \times d6 \leq 0.25 \times \lambda0$,
$1.45 \leq n7 \leq 1.50$ and $0.04 \times \lambda0 \leq n7 \times d7 \leq 0.08 \times \lambda0$,
$2.00 \leq n8 \leq 2.30$ and $0.09 \times \lambda0 \leq n8 \times d8 \leq 0.16 \times \lambda0$,
$1.38 \leq n9 \leq 1.41$ and $0.14 \times \lambda0 \leq n9 \times d9 \leq 0.26 \times \lambda0$, and
$1.45 \leq n10 \leq 1.50$ and $0.04 \times \lambda0 \leq n10 \times d10 \leq 0.08 \times \lambda0$.

The thickness of each of the layers 101A to 110A may be adjusted in the range of ±30% in view of the control of the lens form, the optical characteristics, and so forth.

The thickness range of the antireflection film 100A is more preferably within ±10% in view of optical performance. That is the antireflection film 100A more preferably meets the following requirements:

$0.47 \times \lambda0 \leq n1 \times d1 \leq 0.58 \times \lambda0$,
$0.04 \times \lambda0 \leq n2 \times d2 \leq 0.05 \times \lambda0$,
$0.08 \times \lambda0 \leq n3 \times d3 \leq 0.10 \times \lambda0$,
$0.08 \times \lambda0 \leq n4 \times d4 \leq 0.10 \times \lambda0$,
$0.04 \times \lambda0 \leq n5 \times d5 \leq 0.05 \times \lambda0$,
$0.17 \times \lambda0 \leq n6 \times d6 \leq 0.21 \times \lambda0$,
$0.06 \times \lambda0 \leq n7 \times d7 \leq 0.07 \times \lambda0$,
$0.11 \times \lambda0 \leq n8 \times d8 \leq 0.14 \times \lambda0$,
$0.18 \times \lambda0 \leq n9 \times d9 \leq 0.22 \times \lambda0$, and
$0.06 \times \lambda0 \leq n10 \times d10 \leq 0.70 \times \lambda0$.

The antireflection film preferably meets the above requirements in a range of from 400 nm to 700 nm.

The thickness of each of the layers 101A to 110A may be adjusted in the range of ±10% in view of the control of the lens form, the optical characteristics, and so forth.

In the second embodiment, in particular, the thickness of the first layer 101A that has only a small effect on optical performance is larger than those of the layers 102A to 108A, so that the compressive stress of the entire multilayer film 120A is increased, thereby reducing the effect of the expansion of the resin lens 200A.

An antireflection film including seven or less layers is difficult to have a wide antireflection band and is insufficient for a high-curvature lens. An antireflection film including 11 or more layers is disadvantageous in that the thickness and the costs are increased.

The spectral reflectance of the antireflection film 100A will be described below. The reflectance of the antireflection film 100A at a wavelength of 550 nm is denoted by R550. The reflectance of the antireflection film 100A at a wavelength of 650 nm is denoted by R650. The reflectance of the antireflection film 100A at a wavelength of 850 nm is denoted by R850.

Regarding the relationship among the reflectances at wavelengths of 550 nm, 650 nm, and 850 nm, when R550<R650, a reflected color in the central area of the lens is a reddish color, which may not be used. The results illustrated in FIG. 6 indicate that R550≥R650 may be used. When R650<R850, an antireflection band is narrow, which means the degradation of the antireflection performance due to nonuniformity in thickness. The results illustrated in FIG. 6 indicate that R650≥R850 may be used. When R850 is 1% or less (i.e., R850≤1%), in the case of a resin lens having a curvature so as to have a half aperture angle of 45° or less, the effect of improving the nonuniformity in thickness should be provided.

The results illustrated in FIGS. 6 and 12 indicate that when R550 is 1.5% or less (i.e., 1.5%≥R550), the antireflection effect of the antireflection film 100A according to the second embodiment is superior to that of the third comparative embodiment.

The antireflection film 100A may have a reflectance that meets 1.5%≥R550≥R650≥R850, and R850≤1% in the central area of the resin lens (lens base) 200A.

A method for producing the optical element 300A is the same as the method for producing the optical element 300 according to the first embodiment, and descriptions are not redundantly repeated.

In the second embodiment, even if the optical element 300A is exposed to a high-temperature environment (for example, 70° C.) in a vehicle or the like, little or no cracking occurs in the antireflection film 100A.

Accordingly, the high-performance optical element 300A is produced, in which even in the case of the optical element 300A including the high-curvature resin lens 200A, the antireflection film 100A has an effectively reduced difference in reflectance between the peripheral area and the central area, and little or no cracking occurs in the antireflection film 100A even at a high temperature.

Third Embodiment

In a third embodiment, an optical element that includes an eight-layer antireflection film on a resin base and that has a reflectance of 1% or less from the visible region with a wavelength of 450 nm to the near-infrared region with a wavelength of 850 nm is described.

Table 11 summarizes the film structure of the eight-layer antireflection film of the third embodiment.

TABLE 11

Design reference wavelength λ0: 550 nm
Incident angle θ: 0°

| Layer | Material | Refractive index n | Optical thickness n × d |
|---|---|---|---|
| Base | COP resin | 1.54 | |
| First layer | SiO$_2$ | 1.47 | 0.55 × λ0 |
| Second layer | Ta$_2$O$_5$ | 2.12 | 0.07 × λ0 |
| Third layer | SiO$_2$ | 1.47 | 0.11 × λ0 |
| Fourth layer | Ta$_2$O$_5$ | 2.12 | 0.21 × λ0 |
| Fifth layer | SiO$_2$ | 1.47 | 0.07 × λ0 |
| Sixth layer | Ta$_2$O$_5$ | 2.12 | 0.14 × λ0 |
| Seventh layer | MgF$_2$ | 1.39 | 0.22 × λ0 |
| Eighth layer | SiO$_2$ | 1.47 | 0.05 × λ0 |
| Medium | air | 1.00 | |

Table 12 summarizes the film structure of a seven-layer antireflection film of a fourth comparative embodiment, which is a comparative embodiment corresponding to the third embodiment.

TABLE 12

Design reference wavelength λ0: 550 nm
Incident angle θ: 0°

| Layer | Material | Refractive index n | Optical thickness n × d |
|---|---|---|---|
| Base | COP resin | 1.54 | |
| First layer | SiO$_2$ | 1.47 | 0.55 × λ0 |
| Second layer | Ta$_2$O$_5$ | 2.12 | 0.07 × λ0 |

TABLE 12-continued

Design reference wavelength λ0: 550 nm
Incident angle θ: 0°

| Layer | Material | Refractive index n | Optical thickness n × d |
|---|---|---|---|
| Third layer | SiO$_2$ | 1.47 | 0.11 × λ0 |
| Fourth layer | Ta$_2$O$_5$ | 2.12 | 0.21 × λ0 |
| Fifth layer | SiO$_2$ | 1.47 | 0.07 × λ0 |
| Sixth layer | Ta$_2$O$_5$ | 2.12 | 0.14 × λ0 |
| Seventh layer | MgF$_2$ | 1.39 | 0.29 × λ0 |
| Medium | air | 1.00 | |

Figure 13:
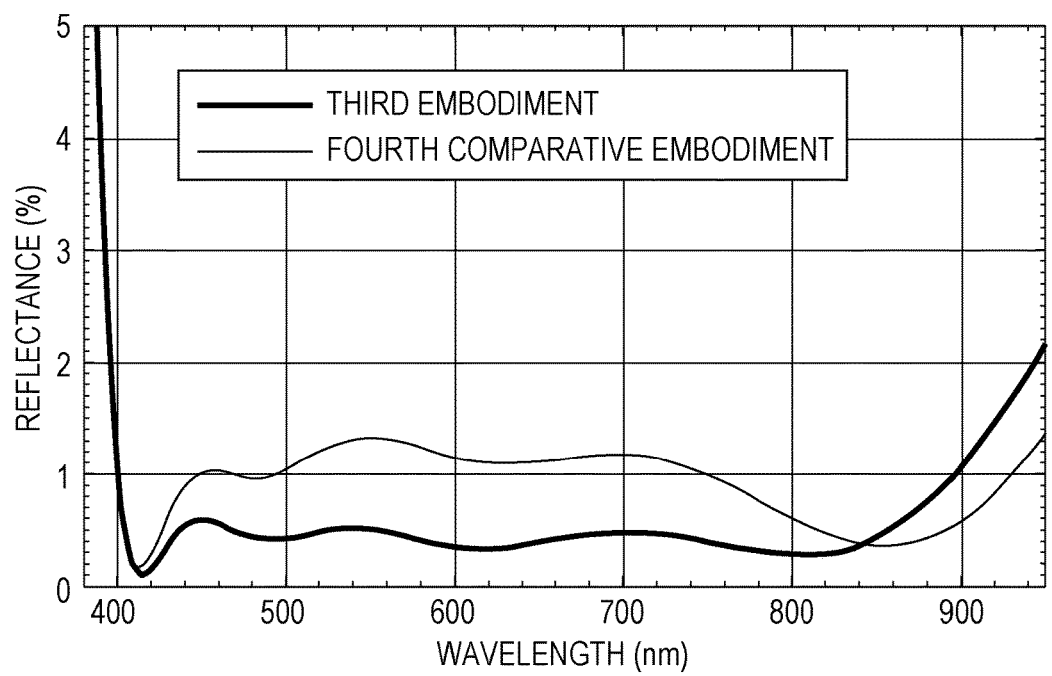
FIG. 13 is a graph depicting spectral reflectance properties of a third embodiment and a fourth comparative embodiment.

FIG. 13 is a graph depicting spectral reflectance properties in the third embodiment and the fourth comparative embodiment. In FIG. 13, a thick line indicates the spectral reflectance properties in the third embodiment, and a thin line indicates the spectral reflectance properties in the fourth comparative embodiment.

Unlike the third embodiment, the film structure in the fourth comparative embodiment does not include a silicon oxide film on the MgF$_2$ layer. The results indicate that in the third embodiment, the reflectance is 1% or less in the entire wavelength range of 420 nm to 850 nm, unlike the fourth comparative embodiment, and in particular, the reflectance is reduced by half in the visible region.

A reflectance of 1% or less is achieved by adjusting the thickness of each of the layers of the film structure in the third embodiment within ±20% in order to adjust a manufacturing error and variations in refractive index of each layer, provided that the refractive index of the resin material used for the base is in the range of 1.48 to 1.65.

When the layers of the third embodiment have respective refractive indices of n1, n2, n3, n4, n5, n6, n7, and n8 and physical thicknesses of d1, d2, d3, d4, d5, d6, d7, and d8, in this order from the layer on the surface of the lens base, the layers preferably meet the following requirements:
1.45≤n1≤1.50 and 0.44λ0≤n1×d1≤0.67λ0,
2.00≤n2≤2.30 and 0.05λ0≤n2×d2≤0.09λ0,
1.45≤n3≤1.50 and 0.09λ0≤n3×d3≤0.14λ0,
2.00≤n4≤2.30 and 0.16λ0≤n4×d4≤0.25λ0,
1.45≤n5≤1.50 and 0.05λ0≤n5×d5≤0.09λ0,
2.00≤n6≤2.30 and 0.11λ0≤n6×d6≤0.17λ0,
1.38≤n7≤1.41 and 0.17λ0≤n7×d7≤0.27λ0, and
1.45≤n8≤1.50 and 0.04λ0≤n8×d8≤0.07λ0, where λ0 represents a design reference wavelength.

The layers preferably meet the above requirements in a range of from 400 nm to 700 nm.

Fourth Embodiment

In a fourth embodiment, an optical element that includes a ten-layer antireflection film on a resin base and that has a reflectance of 1% or less from the visible region with a wavelength of 420 nm to the near-infrared region with a wavelength of 850 nm is exemplified.

Table 13 summarizes the film structure of the ten-layer antireflection film of the fourth embodiment.

TABLE 13

Design reference wavelength λ0: 550 nm
Incident angle θ: 0°

| Layer | Material | Refractive index n | Optical thickness n × d |
|---|---|---|---|
| Base | COP resin | 1.54 | |
| First layer | SiO$_2$ | 1.47 | 0.50 × λ0 |

TABLE 13-continued

Design reference wavelength λ0: 550 nm
Incident angle θ: 0°

| Layer | Material | Refractive index n | Optical thickness n × d |
|---|---|---|---|
| Second layer | $Ta_2O_5$ | 2.12 | 0.04 × λ0 |
| Third layer | $SiO_2$ | 1.47 | 0.10 × λ0 |
| Fourth layer | $Ta_2O_5$ | 2.12 | 0.09 × λ0 |
| Fifth layer | $SiO_2$ | 1.47 | 0.05 × λ0 |
| Sixth layer | $Ta_2O_5$ | 2.12 | 0.22 × λ0 |
| Seventh layer | $SiO_2$ | 1.47 | 0.06 × λ0 |
| Eighth layer | $Ta_2O_5$ | 2.12 | 0.12 × λ0 |
| Ninth layer | $MgF_2$ | 1.39 | 0.19 × λ0 |
| Tenth layer | $SiO_2$ | 1.47 | 0.07 × λ0 |
| Medium | air | 1.00 | |

Table 14 summarizes the film structure of a nine-layer antireflection film of a fifth comparative embodiment, which is a comparative embodiment corresponding to the fourth embodiment.

TABLE 14

Design reference wavelength λ0: 550 nm
Incident angle θ: 0°

| Layer | Material | Refractive index n | Optical thickness n × d |
|---|---|---|---|
| Base | COP resin | 1.54 | |
| First layer | $SiO_2$ | 1.47 | 0.50 × λ0 |
| Second layer | $Ta_2O_5$ | 2.12 | 0.04 × λ0 |
| Third layer | $SiO_2$ | 1.47 | 0.10 × λ0 |
| Fourth layer | $Ta_2O_5$ | 2.12 | 0.09 × λ0 |
| Fifth layer | $SiO_2$ | 1.47 | 0.05 × λ0 |
| Sixth layer | $Ta_2O_5$ | 2.12 | 0.22 × λ0 |
| Seventh layer | $SiO_2$ | 1.47 | 0.06 × λ0 |
| Eighth layer | $Ta_2O_5$ | 2.12 | 0.12 × λ0 |
| Ninth layer | $SiO_2$ | 1.47 | 0.29 × λ0 |
| Medium | air | 1.00 | |

Figure 14:
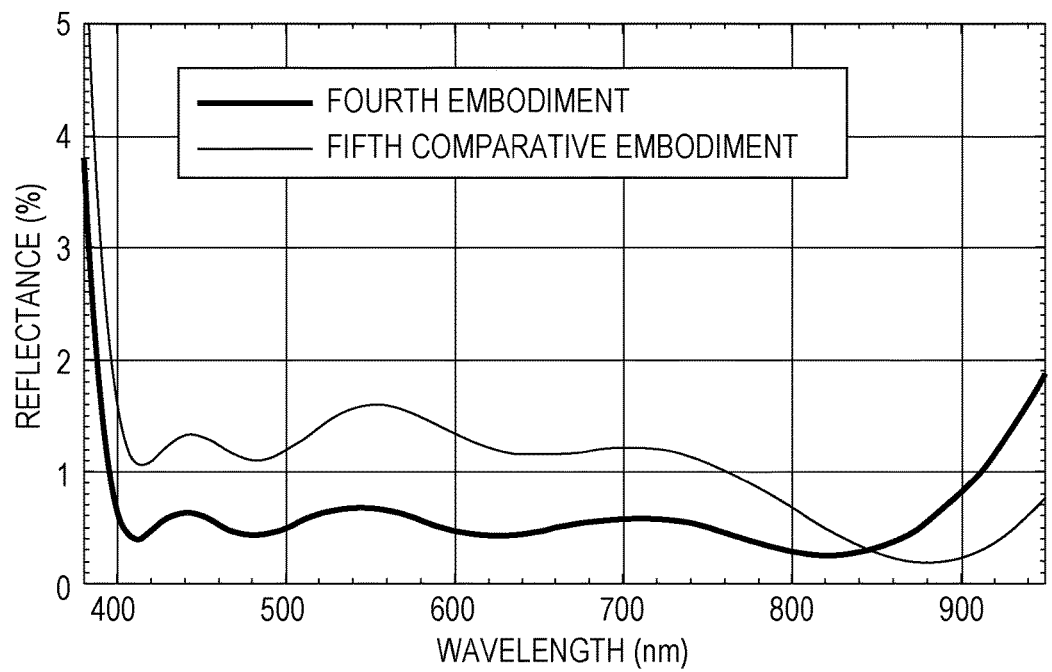
FIG. 14 is a graph depicting spectral reflectance properties of a fourth embodiment and a fifth comparative embodiment.

FIG. 14 is a graph depicting spectral reflectance properties in the fourth embodiment and the fifth comparative embodiment. In FIG. 14, a thick line indicates the spectral reflectance properties in the fourth embodiment, and a thin line indicates the spectral reflectance properties in the fifth comparative embodiment.

The film structure in the fifth comparative embodiment does not include a $MgF_2$ layer, compared with the fourth embodiment. The results indicate that in the fourth embodiment including the $MgF_2$ layer, the reflectance is 1% or less in the entire wavelength range of 420 nm to 850 nm, unlike the fifth comparative embodiment, and in particular, the reflectance is reduced by half in the visible region.

A reflectance of 1% or less is achieved by adjusting the thickness of each of the layers of the film structure in the fourth embodiment within ±20% in order to adjust a manufacturing error and variations in refractive index of each layer, provided that the refractive index of the resin material used for the base is in the range of 1.48 to 1.65.

When the layers of the antireflection film of the fourth embodiment have respective refractive indices of n1, n2, n3, n4, n5, n6, n7, n8, n9, and n10 and physical thicknesses of d1, d2, d3, d4, d5, d6, d7, d8, d9, and d10, in this order from the layer on the surface of the lens base, the layers preferably meet the following requirements:

1.45≤n1≤1.50 and 0.40λ0≤n1×d1≤0.61λ0,
2.00≤n2≤2.30 and 0.03λ0≤n2×d2≤0.05λ0,
1.45≤n3≤1.50 and 0.07λ0≤n3×d3≤0.12λ0,
2.00≤n4≤2.30 and 0.07λ0≤n4×d4≤0.12λ0,
1.45≤n5≤1.50 and 0.03λ0≤n5×d5≤0.06λ0,
2.00≤n6≤2.30 and 0.17λ0≤n6×d6≤0.27λ0,
1.45≤n7≤1.50 and 0.04λ0≤n7×d7≤0.07λ0,
2.00≤n8≤2.30 and 0.09λ0≤n8×d8≤0.15λ0,
1.38≤n9≤1.41 and 0.15λ0≤n9×d9≤0.24λ0, and
1.45≤n10≤1.50 and 0.05λ0≤n10×d10≤0.08λ0, where λ0 represents a design reference wavelength.

The layers preferably meet the above requirements in a range of from 400 nm to 700 nm.

As described above, the use of the antireflection film of the third or fourth embodiment provides an optical element having good antireflection performance, for example, low reflectance and a high cracking prevention effect in the environmental test, compared with currently commonly used optical elements including film structures on resin bases.

Fifth Embodiment

In a fifth embodiment, an optical element that includes a six-layer antireflection film on a resin base and that has a reflectance of 0.5% or less in the visible region from a wavelength of 450 nm to 650 nm is exemplified.

Table 15 summarizes the film structure of the six-layer antireflection film of the fifth embodiment.

TABLE 15

Design reference wavelength λ0: 550 nm
Incident angle θ: 0°

| Layer | Material | Refractive index n | Optical thickness n × d |
|---|---|---|---|
| Base | COP resin | 1.54 | |
| First layer | $SiO_2$ | 1.47 | 0.36 × λ0 |
| Second layer | $Ta_2O_5$ | 2.12 | 0.04 × λ0 |
| Third layer | $SiO_2$ | 1.47 | 0.09 × λ0 |
| Fourth layer | $Ta_2O_5$ | 2.12 | 0.46 × λ0 |
| Fifth layer | $MgF_2$ | 1.39 | 0.13 × λ0 |
| Sixth layer | $SiO_2$ | 1.47 | 0.08 × λ0 |
| Medium | air | 1.00 | |

Table 16 summarizes the film structure of a five-layer antireflection film of a sixth comparative embodiment, which is a comparative embodiment corresponding to the fifth embodiment.

TABLE 16

Design reference wavelength λ0: 550 nm
Incident angle θ: 0°

| Layer | Material | Refractive index n | Optical thickness n × d |
|---|---|---|---|
| Base | COP resin | 1.54 | |
| First layer | $SiO_2$ | 1.47 | 0.36 × λ0 |
| Second layer | $Ta_2O_5$ | 2.12 | 0.04 × λ0 |
| Third layer | $SiO_2$ | 1.47 | 0.09 × λ0 |
| Fourth layer | $Ta_2O_5$ | 2.12 | 0.46 × λ0 |
| Fifth layer | $SiO_2$ | 1.47 | 0.22 × λ0 |
| Medium | air | 1.00 | |

Figure 15:
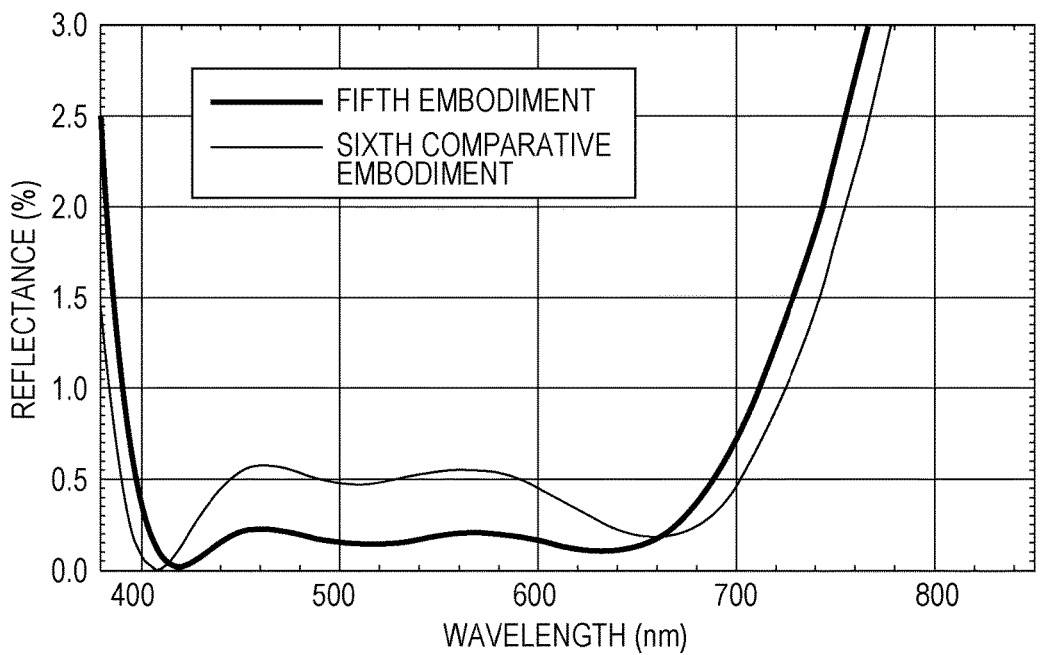
FIG. 15 is a graph depicting spectral reflectance properties of a fifth embodiment and a sixth comparative embodiment.

FIG. 15 is a graph depicting spectral reflectance properties in the fifth embodiment and the sixth comparative embodiment. In FIG. 15, a thick line indicates the spectral reflectance properties in the fifth embodiment, and a thin line indicates the spectral reflectance properties in the sixth comparative embodiment.

Unlike the fifth embodiment, the film structure in the sixth comparative embodiment does not include a $MgF_2$ layer. The antireflection film of the fifth embodiment has a reflectance of 0.5% or less in the visible region from a wavelength of 450 nm to 650 nm. The reflectance is reduced by half, compared with the sixth comparative embodiment.

A reflectance of 0.5% or less is achieved by adjusting the thickness of each of the layers of the film structure in the fifth embodiment within ±30% in order to adjust a manufacturing error and variations in refractive index of each layer, provided that the refractive index of the resin material used for the base is in the range of 1.48 to 1.65.

When the layers of the antireflection film of the fifth embodiment have respective refractive indices of n1, n2, n3, n4, n5, and n6 and physical thicknesses of d1, d2, d3, d4, d5, and d6, in this order from the layer on the surface of the lens base, the layers preferably meet the following requirements:
$1.45 \leq n1 \leq 1.50$ and $0.25\lambda 0 \leq n1 \times d1 \leq 0.48\lambda 0$,
$2.00 \leq n2 \leq 2.30$ and $0.02\lambda 0 \leq n2 \times d2 \leq 0.05\lambda 0$,
$1.45 \leq n3 \leq 1.50$ and $0.06\lambda 0 \leq n3 \times d3 \leq 0.13\lambda 0$,
$2.00 \leq n4 \leq 2.30$ and $0.32\lambda 0 \leq n4 \times d4 \leq 0.60\lambda 0$,
$1.38 \leq n5 \leq 1.41$ and $0.09\lambda 0 \leq n5 \times d5 \leq 0.17\lambda 0$, and
$1.45 \leq n6 \leq 1.50$ and $0.05\lambda 0 \leq n6 \times d6 \leq 0.11\lambda 0$, where $\lambda 0$ represents a design reference wavelength.

The layers preferably meet the above requirements in a range of from 400 nm to 700 nm.

In the optical element of the fifth embodiment, the resin base preferably has a refractive index of 1.48 to 1.65.

Sixth Embodiment

In a sixth embodiment, an optical element that includes an eight-layer antireflection film on a resin base and that has a reflectance of 0.5% or less in the visible region from a wavelength of 450 nm to 650 nm is exemplified.

Table 17 summarizes the film structure of the eight-layer antireflection film of the sixth embodiment.

TABLE 17

| Design reference wavelength $\lambda 0$: 550 nm Incident angle $\theta$: 0° | | | |
|---|---|---|---|
| Layer | Material | Refractive index n | Optical thickness n × d |
| Base | COP resin | 1.54 | |
| First layer | $SiO_2$ | 1.47 | $0.47 \times \lambda 0$ |
| Second layer | $Ta_2O_5$ | 2.12 | $0.06 \times \lambda 0$ |
| Third layer | $SiO_2$ | 1.47 | $0.09 \times \lambda 0$ |
| Fourth layer | $Ta_2O_5$ | 2.12 | $0.27 \times \lambda 0$ |
| Fifth layer | $SiO_2$ | 1.47 | $0.03 \times \lambda 0$ |
| Sixth layer | $Ta_2O_5$ | 2.12 | $0.15 \times \lambda 0$ |
| Seventh layer | $MgF_2$ | 1.39 | $0.15 \times \lambda 0$ |
| Eighth layer | $SiO_2$ | 1.47 | $0.07 \times \lambda 0$ |
| Medium | air | 1.00 | |

Table 18 summarizes the film structure of a seven-layer antireflection film of a seventh comparative embodiment, which is a comparative embodiment corresponding to the sixth embodiment.

TABLE 18

| Design reference wavelength $\lambda 0$: 550 nm Incident angle $\theta$: 0° | | | |
|---|---|---|---|
| Layer | Material | Refractive index n | Optical thickness n × d |
| Base | COP resin | 1.54 | |
| First layer | $SiO_2$ | 1.47 | $0.47 \times \lambda 0$ |
| Second layer | $Ta_2O_5$ | 2.12 | $0.06 \times \lambda 0$ |
| Third layer | $SiO_2$ | 1.47 | $0.09 \times \lambda 0$ |
| Fourth layer | $Ta_2O_5$ | 2.12 | $0.27 \times \lambda 0$ |
| Fifth layer | $SiO_2$ | 1.47 | $0.03 \times \lambda 0$ |
| Sixth layer | $Ta_2O_5$ | 2.12 | $0.15 \times \lambda 0$ |

TABLE 18-continued

| Design reference wavelength $\lambda 0$: 550 nm Incident angle $\theta$: 0° | | | |
|---|---|---|---|
| Layer | Material | Refractive index n | Optical thickness n × d |
| Seventh layer | $SiO_2$ | 1.47 | $0.22 \times \lambda 0$ |
| Medium | air | 1.00 | |

Figure 16:
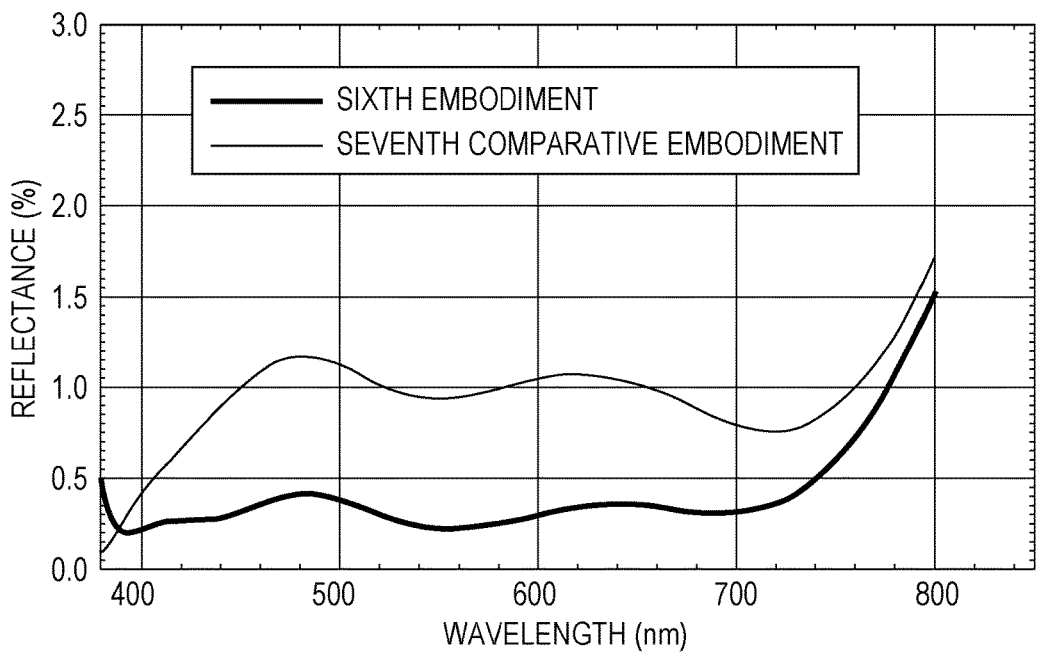
FIG. 16 is a graph depicting spectral reflectance properties of a sixth embodiment and a seventh comparative embodiment.

FIG. 16 is a graph depicting spectral reflectance properties in the sixth embodiment and the seventh comparative embodiment.

Unlike the sixth embodiment, the film structure in the seventh comparative embodiment does not include a $MgF_2$ layer. The antireflection film of the sixth embodiment has a reflectance of 0.5% or less in the entire region from a wavelength of 450 nm to 650 nm. In particular, the reflectance is reduced by half, compared with the seventh comparative embodiment.

A reflectance of 0.5% or less is achieved by adjusting the thickness of each of the layers of the film structure in the sixth embodiment within ±30% in order to adjust a manufacturing error and variations in refractive index of each layer, provided that the refractive index of the resin material used for the base is in the range of 1.48 to 1.65.

When the layers of the antireflection film of the sixth embodiment have respective refractive indices of n1, n2, n3, n4, n5, n6, n7, and n8 and physical thicknesses of d1, d2, d3, d4, d5, d6, d7, and d8, in this order from the layer on the surface of the lens base, the layers preferably meet the following requirements:
$1.45 \leq n1 \leq 1.50$ and $0.33\lambda 0 \leq n1 \times d1 \leq 0.62\lambda 0$,
$2.00 \leq n2 \leq 2.30$ and $0.04\lambda 0 \leq n2 \times d2 \leq 0.08\lambda 0$,
$1.45 \leq n3 \leq 1.50$ and $0.06\lambda 0 \leq n3 \times d3 \leq 0.12\lambda 0$,
$2.00 \leq n4 \leq 2.30$ and $0.19\lambda 0 \leq n4 \times d4 \leq 0.36\lambda 0$,
$1.45 \leq n5 \leq 1.50$ and $0.01\lambda 0 \leq n5 \times d5 \leq 0.04\lambda 0$,
$2.00 \leq n6 \leq 2.30$ and $0.10\lambda 0 \leq n6 \times d6 \leq 0.19\lambda 0$,
$1.38 \leq n7 \leq 1.41$ and $0.10\lambda 0 \leq n7 \times d7 \leq 0.21\lambda 0$, and
$1.45 \leq n8 \leq 1.50$ and $0.05\lambda 0 \leq n8 \times d8 \leq 0.10\lambda 0$, where $\lambda 0$ represents a design reference wavelength.

The layers preferably meet the above requirements in a range of from 400 nm to 700 nm.

In the optical element of the sixth embodiment, the resin base preferably has a refractive index of 1.48 to 1.65.

The optical element of each of the fifth and sixth embodiments has low reflectance and a high cracking prevention effect in the environmental test.

The present invention is not limited to the foregoing embodiments. Many modifications may be made within the technical scope of the present disclosure. The effects described in the embodiments of the present disclosure are merely the enumeration of the most preferable effects, and the effects are not limited to those described in the embodiments.

While the formation of the antireflection film on the resin lens serving as the lens base has been described in the foregoing embodiments, the present invention is not limited thereto. The antireflection film according to the embodiments may also be used for a glass lens serving as the lens base.

According to embodiments of the present disclosure, little or no cracking occurs in the antireflection film even when the antireflection film is exposed to a high-temperature environment.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-011533 filed Jan. 25, 2016, which is hereby incorporated by reference herein in its entirety.

What is claimed is:

1. An optical element, comprising:
a lens base; and
an antireflection film arranged on a surface of the lens base,
wherein the antireflection film includes:
a multilayer film arranged on the surface of the lens base, the multilayer film including:
one or more layers each formed of a silicon oxide film, and
one or more layers each formed of a tantalum oxide film, the one or more layers each formed of the silicon oxide film and the one or more layers each formed of the tantalum oxide film being alternately stacked;
an inner layer arranged on a surface of the multilayer film, the inner layer being formed of a magnesium fluoride film; and
an outer layer arranged on a surface of the inner layer, the outer layer being formed of a silicon oxide film.

2. The optical element according to claim 1,
wherein the antireflection film has a reflectance that meets $1.5\% \geq R550 \geq R650 \geq R850$, and $R850 \leq 1\%$ in a central area of the lens base, where R550 represents a reflectance of the antireflection film at a wavelength of 550 nm, R650 represents a reflectance of the antireflection film at a wavelength of 650 nm, and R850 represents a reflectance of the antireflection film at a wavelength of 850 nm.

3. The optical element according to claim 1,
wherein the multilayer film includes four layers in which the layers each formed of the silicon oxide film and the layers each formed of the tantalum oxide film are alternately stacked in this order on the surface of the lens base,
the antireflection film includes six layers including the multilayer film, the inner layer, and the outer layer,
the six layers have respective refractive indices of n1, n2, n3, n4, n5, and n6 and physical thicknesses of d1, d2, d3, d4, d5, and d6, in this order from the layer on the surface of the lens base, and
the antireflection film meets the following requirements:
$1.45 \leq n1 \leq 1.50$ and $0.25 \lambda 0 \leq n1 \times d1 \leq 0.48 \times \lambda 0$,
$2.00 \leq n2 \leq 2.30$ and $0.02 \lambda 0 \leq n2 \times d2 \leq 0.05 \times \lambda 0$,
$1.45 \leq n3 \leq 1.50$ and $0.06 \lambda 0 \leq n3 \times d3 \leq 0.13 \times \lambda 0$,
$2.00 \leq n4 \leq 2.30$ and $0.32 \lambda 0 \leq n4 \times d4 \leq 0.60 \times \lambda 0$,
$1.38 \leq n5 \leq 1.41$ and $0.09 \lambda 0 \leq n5 \times d5 \leq 0.17 \times \lambda 0$, and
$1.45 \leq n6 \leq 1.50$ and $0.05 \lambda 0 \leq n6 \times d6 \leq 0.11 \times \lambda 0$, where $\lambda 0$ represents a design reference wavelength.

4. The optical element according to claim 1,
wherein the lens base is composed of a resin having a refractive index of 1.48 or more and 1.55 or less.

5. The optical element according to claim 4,
wherein the lens base is composed of a cycloolefin polymer resin or a PMMA resin.

6. The optical element according to claim 1,
wherein the multilayer film includes six layers in which the layers each formed of the silicon oxide film and the layers each formed of the tantalum oxide film are alternately stacked in this order on the surface of the lens base, and the antireflection film includes eight layers including the multilayer film, the inner layer, and the outer layer.

7. The optical element according to claim 3,
wherein the layers have respective refractive indices of n1, n2, n3, n4, n5, n6, n7, and n8 and physical thicknesses of d1, d2, d3, d4, d5, d6, d7, and d8, in this order from the layer on the surface of the lens base, and
wherein the antireflection film meets the following requirements:
$1.45 \leq n1 \leq 1.50$ and $0.44 \lambda 0 \leq n1 \times d1 \leq 0.67 \times \lambda 0$,
$2.00 \leq n2 \leq 2.30$ and $0.05 \lambda 0 \leq n2 \times d2 \leq 0.09 \times \lambda 0$,
$1.45 \leq n3 \leq 1.50$ and $0.09 \lambda 0 \leq n3 \times d3 \leq 0.14 \times \lambda 0$,
$2.00 \leq n4 \leq 2.30$ and $0.16 \lambda 0 \leq n4 \times d4 \leq 0.25 \times \lambda 0$,
$1.45 \leq n5 \leq 1.50$ and $0.05 \lambda 0 \leq n5 \times d5 \leq 0.09 \times \lambda 0$,
$2.00 \leq n6 \leq 2.30$ and $0.11 \lambda 0 \leq n6 \times d6 \leq 0.17 \times \lambda 0$,
$1.38 \leq n7 \leq 1.41$ and $0.17 \lambda 0 \leq n7 \times d7 \leq 0.27 \times \lambda 0$, and
$1.45 \leq n8 \leq 1.50$ and $0.04 \lambda 0 \leq n8 \times d8 \leq 0.07 \times \lambda 0$, where $\lambda 0$ represents a design reference wavelength.

8. The optical element according to claim 6,
wherein the layers have respective refractive indices of n1, n2, n3, n4, n5, n6, n7, and n8 and physical thicknesses of d1, d2, d3, d4, d5, d6, d7, and d8, in this order from the layer on the surface of the lens base, and
wherein the antireflection film meets the following requirements:
$1.45 \leq n1 \leq 1.50$ and $0.33 \lambda 0 \leq n1 \times d1 \leq 0.62 \times \lambda 0$,
$2.00 \leq n2 \leq 2.30$ and $0.04 \lambda 0 \leq n2 \times d2 \leq 0.08 \times \lambda 0$,
$1.45 \leq n3 \leq 1.50$ and $0.06 \lambda 0 \leq n3 \times d3 \leq 0.12 \times \lambda 0$,
$2.00 \leq n4 \leq 2.30$ and $0.19 \lambda 0 \leq n4 \times d4 \leq 0.36 \times \lambda 0$,
$1.45 \leq n5 \leq 1.50$ and $0.01 \lambda 0 \leq n5 \times d5 \leq 0.04 \times \lambda 0$,
$2.00 \leq n6 \leq 2.30$ and $0.10 \lambda 0 \leq n6 \times d6 \leq 0.19 \times \lambda 0$,
$1.38 \leq n7 \leq 1.41$ and $0.10 \lambda 0 \leq n7 \times d7 \leq 0.21 \times \lambda 0$, and
$1.45 \leq n8 \leq 1.50$ and $0.05 \lambda 0 \leq n8 \times d8 \leq 0.10 \times \lambda 0$, where $\lambda 0$ represents a design reference wavelength.

9. The optical element according to claim 6,
wherein the layers have respective refractive indices of n1, n2, n3, n4, n5, n6, n7, and n8 and physical thicknesses of d1, d2, d3, d4, d5, d6, d7, and d8, in this order from the layer on the surface of the lens base, and
wherein the antireflection film meets the following requirements:
$1.45 \leq n1 \leq 1.50$ and $0.39 \times \lambda 0 \leq n1 \times d1 \leq 0.72 \times \lambda 0$,
$2.00 \leq n2 \leq 2.30$ and $0.05 \times \lambda 0 \leq n2 \times d2 \leq 0.09 \times \lambda 0$,
$1.45 \leq n3 \leq 1.50$ and $0.07 \times \lambda 0 \leq n3 \times d3 \leq 0.13 \times \lambda 0$,
$2.00 \leq n4 \leq 2.30$ and $0.16 \times \lambda 0 \leq n4 \times d4 \leq 0.30 \times \lambda 0$,
$1.45 \leq n5 \leq 1.50$ and $0.05 \times \lambda 0 \leq n5 \times d5 \leq 0.09 \times \lambda 0$,
$2.00 \leq n6 \leq 2.30$ and $0.10 \times \lambda 0 \leq n6 \times d6 \leq 0.19 \times \lambda 0$,
$1.38 \leq n7 \leq 1.41$ and $0.12 \times \lambda 0 \leq n7 \times d7 \leq 0.22 \times \lambda 0$, and
$1.45 \leq n8 \leq 1.50$ and $0.07 \times \lambda 0 \leq n8 \times d8 \leq 0.14 \times \lambda 0$, where $\lambda 0$ represents a design reference wavelength.

10. The optical element according to claim 9,
wherein the antireflection film meets the following requirements:
$0.50 \times \lambda \leq n1 \times d1 \leq 0.61 \times \lambda 0$,
$0.06 \times \lambda \leq n2 \times d2 \leq 0.08 \times \lambda 0$,
$0.09 \times \lambda \leq n3 \times d3 \leq 0.11 \times \lambda 0$,
$0.21 \times \lambda \leq n4 \times d4 \leq 0.25 \times \lambda 0$,
$0.06 \times \lambda \leq n5 \times d5 \leq 0.07 \times \lambda 0$,
$0.13 \times \lambda \leq n6 \times d6 \leq 0.16 \times \lambda 0$,
$0.15 \times \lambda \leq n7 \times d7 \leq 0.19 \times \lambda 0$, and
$0.10 \times \lambda \leq n8 \times d8 \leq 0.12 \times \lambda 0$.

11. The optical element according to claim 1,
wherein the multilayer film includes eight layers in which the layers each formed of the silicon oxide film and the layers each formed of the tantalum oxide film are alternately stacked in this order on the surface of the lens base, and the antireflection film includes ten layers including the multilayer film, the inner layer, and the outer layer.

12. The optical element according to claim 11, wherein the layers have respective refractive indices of $n_1$, $n_2$, $n_3$, $n_4$, $n_5$, $n_6$, $n_7$, $n_8$, $n_9$, and $n_{10}$ and physical thicknesses of $d_1$, $d_2$, $d_3$, $d_4$, $d_5$, $d_6$, $d_7$, $d_8$, $d_9$, and $d_{10}$, in this order from the layer on the surface of the lens base, and wherein the antireflection film meets the following requirements:

$1.45 \leq n_1 \leq 1.50$ and $0.40\lambda_0 \leq n_1 \times d_1 \leq 0.61 \times \lambda_0$,
$2.00 \leq n_2 \leq 2.30$ and $0.03\lambda_0 \leq n_2 \times d_2 \leq 0.05 \times \lambda_0$,
$1.45 \leq n_3 \leq 1.50$ and $0.07\lambda_0 \leq n_3 \times d_3 \leq 0.12 \times \lambda_0$,
$2.00 \leq n_4 \leq 2.30$ and $0.07\lambda_0 \leq n_4 \times d_4 \leq 0.12 \times \lambda_0$,
$1.45 \leq n_5 \leq 1.50$ and $0.03\lambda_0 \leq n_5 \times d_5 \leq 0.06 \times \lambda_0$,
$2.00 \leq n_6 \leq 2.30$ and $0.17\lambda_0 \leq n_6 \times d_6 \leq 0.27 \times \lambda_0$,
$1.45 \leq n_7 \leq 1.50$ and $0.04\lambda_0 \leq n_7 \times d_7 \leq 0.07 \times \lambda_0$,
$2.00 \leq n_8 \leq 2.30$ and $0.09\lambda_0 \leq n_8 \times d_8 \leq 0.15 \times \lambda_0$,
$1.38 \leq n_9 \leq 1.41$ and $0.15\lambda_0 \leq n_9 \times d_9 \leq 0.24 \times \lambda_0$, and
$1.45 \leq n_{10} \leq 1.50$ and $0.05\lambda_0 \leq n_{10} \times d_{10} \leq 0.08 \times \lambda_0$, where $\lambda_0$ represents a design reference wavelength.

13. The optical element according to claim 11, wherein the layers have respective refractive indices of $n_1$, $n_2$, $n_3$, $n_4$, $n_5$, $n_6$, $n_7$, $n_8$, $n_9$, and $n_{10}$ and physical thicknesses of $d_1$, $d_2$, $d_3$, $d_4$, $d_5$, $d_6$, $d_7$, $d_8$, $d_9$, and $d_{10}$, in this order from the layer on the surface of the lens base, and wherein the antireflection film meets the following requirements:

$1.45 \leq n_1 \leq 1.50$ and $0.37 \times \lambda_0 \leq n_1 \times d_1 \leq 0.69 \times \lambda_0$,
$2.00 \leq n_2 \leq 2.30$ and $0.03 \times \lambda_0 \leq n_2 \times d_2 \leq 0.06 \times \lambda_0$,
$1.45 \leq n_3 \leq 1.50$ and $0.06 \times \lambda_0 \leq n_3 \times d_3 \leq 0.12 \times \lambda_0$,
$2.00 \leq n_4 \leq 2.30$ and $0.06 \times \lambda_0 \leq n_4 \times d_4 \leq 0.12 \times \lambda_0$,
$1.45 \leq n_5 \leq 1.50$ and $0.03 \times \lambda_0 \leq n_5 \times d_5 \leq 0.06 \times \lambda_0$,
$2.00 \leq n_6 \leq 2.30$ and $0.13 \times \lambda_0 \leq n_6 \times d_6 \leq 0.25 \times \lambda_0$,
$1.45 \leq n_7 \leq 1.50$ and $0.04 \times \lambda_0 \leq n_7 \times d_7 \leq 0.08 \times \lambda_0$,
$2.00 \leq n_8 \leq 2.30$ and $0.09 \times \lambda_0 \leq n_8 \times d_8 \leq 0.16 \times \lambda_0$,
$1.38 \leq n_9 \leq 1.41$ and $0.14 \times \lambda_0 \leq n_9 \times d_9 \leq 0.26 \times \lambda_0$, and
$1.45 \leq n_{10} \leq 1.50$ and $0.04 \times \lambda_0 \leq n_{10} \times d_{10} \leq 0.08 \times \lambda_0$, where $\lambda_0$ represents a design reference wavelength.

14. The optical element according to claim 13, wherein the antireflection film meets the following requirements:

$0.47 \times \lambda_0 \leq n_1 \times d_1 \leq 0.58 \times \lambda_0$,
$0.04 \times \lambda_0 \leq n_2 \times d_2 \leq 0.05 \times \lambda_0$,
$0.08 \times \lambda_0 \leq n_3 \times d_3 \leq 0.10 \times \lambda_0$,
$0.08 \times \lambda_0 \leq n_4 \times d_4 \leq 0.10 \times \lambda_0$,
$0.04 \times \lambda_0 \leq n_5 \times d_5 \leq 0.05 \times \lambda_0$,
$0.17 \times \lambda_0 \leq n_6 \times d_6 \leq 0.21 \times \lambda_0$,
$0.06 \times \lambda_0 \leq n_7 \times d_7 \leq 0.07 \times \lambda_0$,
$0.11 \times \lambda_0 \leq n_8 \times d_8 \leq 0.14 \times \lambda_0$,
$0.18 \times \lambda_0 \leq n_9 \times d_9 \leq 0.22 \times \lambda_0$, and
$0.06 \times \lambda_0 \leq n_{10} \times d_{10} \leq 0.70 \times \lambda_0$.

15. A method for producing an optical element including an antireflection film on a lens base, the method comprising:

a multilayer film formation step of forming a multilayer film on a surface of the lens base, the multilayer film including:
- a layer formed of a silicon oxide film, and
- a layer formed of a tantalum oxide film, the layer formed of the silicon oxide film and the layer formed of the tantalum oxide film being alternately stacked;

an inner layer formation step of forming an inner layer on a surface of the multilayer film, the inner layer being formed of a magnesium fluoride film; and an outer layer formation step of forming an outer layer on a surface of the inner layer, the outer layer being formed of a silicon oxide film.

16. The method according to claim 15, wherein the multilayer film formation step, the inner layer formation step, and the outer layer formation step are performed by an ion-assisted deposition process.

* * * * *